(12) United States Patent
Minegishi et al.

(10) Patent No.: US 10,396,564 B2
(45) Date of Patent: Aug. 27, 2019

(54) ELECTRIC POWER TRANSMISSION SYSTEM INCLUDING MODULATORS AND DEMODULATORS, AND CONTROLLER

(71) Applicant: Panasonic Intellectual Property Management Co., Ltd., Osaka (JP)

(72) Inventors: Akira Minegishi, Osaka (JP); Junichi Kanou, Osaka (JP); Atsushi Yamamoto, Kyoto (JP); Masahiro Yamaoka, Osaka (JP); Kohei Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 15/356,793

(22) Filed: Nov. 21, 2016

(65) Prior Publication Data
US 2017/0170664 A1    Jun. 15, 2017

(30) Foreign Application Priority Data
Dec. 14, 2015    (JP) .................................. 2015-243325

(51) Int. Cl.
*H02J 4/00* (2006.01)
*H02J 3/38* (2006.01)
(Continued)

(52) U.S. Cl.
CPC ................ *H02J 4/00* (2013.01); *H02J 3/382* (2013.01); *H02M 1/088* (2013.01);
(Continued)

(58) Field of Classification Search
CPC .......... H02J 4/00; H02J 3/382; H02M 3/3376; H02M 1/4241; H02M 1/088; H02M 2001/0058; Y02B 70/1491; Y02B 70/126
See application file for complete search history.

(56) References Cited

U.S. PATENT DOCUMENTS 5,701,243 A * 12/1997 Youn .................... H02M 1/4241
363/134
6,363,269 B1 * 3/2002 Hanna ................ A61B 5/14551
600/322

(Continued)

FOREIGN PATENT DOCUMENTS

JP    2001-268549    9/2001
JP    2009-060552    3/2009

(Continued)

*Primary Examiner* — Pinping Sun
(74) *Attorney, Agent, or Firm* — McDermott Will & Emery LLP

(57) ABSTRACT

A system includes: a first modulator that modulates a first electric power at a first modulation frequency; a second modulator that modulates a second electric power at a second modulation frequency; a transmission line through which a transmission power obtained by combining a plurality of modulated electric powers is transmitted; a first demodulator that demodulates the transmission power at a first demodulation frequency to generate a third electric power; and a second demodulator that demodulates the transmission power at a second demodulation frequency to generate a fourth electric power. The first modulation frequency and the second modulation frequency are different from each other.

21 Claims, 33 Drawing Sheets

(51) Int. Cl.
*H02M 1/088* (2006.01)
*H02M 1/42* (2007.01)
*H02M 3/337* (2006.01)
*H02M 1/00* (2006.01)

(52) U.S. Cl.
CPC ....... *H02M 1/4241* (2013.01); *H02M 3/3376* (2013.01); *H02M 2001/0058* (2013.01); *Y02B 70/126* (2013.01); *Y02B 70/1491* (2013.01)

(56) References Cited

U.S. PATENT DOCUMENTS

| | | | | |
|---|---|---|---|---|
| 6,469,469 | B1* | 10/2002 | Chambers | H02P 23/08 318/801 |
| 7,859,133 | B2* | 12/2010 | Youn | H02J 7/0042 307/64 |
| 2002/0172061 | A1* | 11/2002 | Phadke | H02M 1/38 363/127 |
| 2004/0008018 | A1* | 1/2004 | Miller | G01R 29/085 324/67 |
| 2004/0066094 | A1* | 4/2004 | Suzuki | H02J 3/38 307/18 |
| 2005/0206167 | A1* | 9/2005 | Gehret, Jr. | B60L 3/003 290/2 |
| 2007/0058402 | A1* | 3/2007 | Shekhawat | H02M 1/42 363/89 |
| 2008/0186742 | A1* | 8/2008 | Seong | H02M 3/3376 363/17 |
| 2010/0208501 | A1 | 8/2010 | Matan et al. | |
| 2012/0092903 | A1* | 4/2012 | Nania | H02J 3/383 363/34 |
| 2012/0119583 | A1* | 5/2012 | Allfather | H02J 9/062 307/72 |
| 2012/0181853 | A1* | 7/2012 | Polese | H02J 3/02 307/2 |
| 2012/0185708 | A1 | 7/2012 | Rekimoto et al. | |
| 2012/0205987 | A1* | 8/2012 | Kung | H02J 3/40 307/87 |
| 2012/0320633 | A1* | 12/2012 | Chen | H02M 3/33592 363/21.01 |
| 2013/0317660 | A1 | 11/2013 | Miyama | |
| 2014/0136742 | A1 | 5/2014 | Ooyabu et al. | |
| 2016/0011575 | A1* | 1/2016 | Liu | H02J 3/02 700/296 |
| 2016/0285384 | A1* | 9/2016 | Youssef | H02M 1/4216 |

FOREIGN PATENT DOCUMENTS

| | | |
|---|---|---|
| JP | 2011-036080 | 2/2011 |
| JP | 2011-091954 | 5/2011 |
| JP | 2012-518980 | 8/2012 |
| JP | 2013-138612 | 7/2013 |
| JP | 2013-247762 | 12/2013 |
| JP | 2014-099802 | 5/2014 |

\* cited by examiner

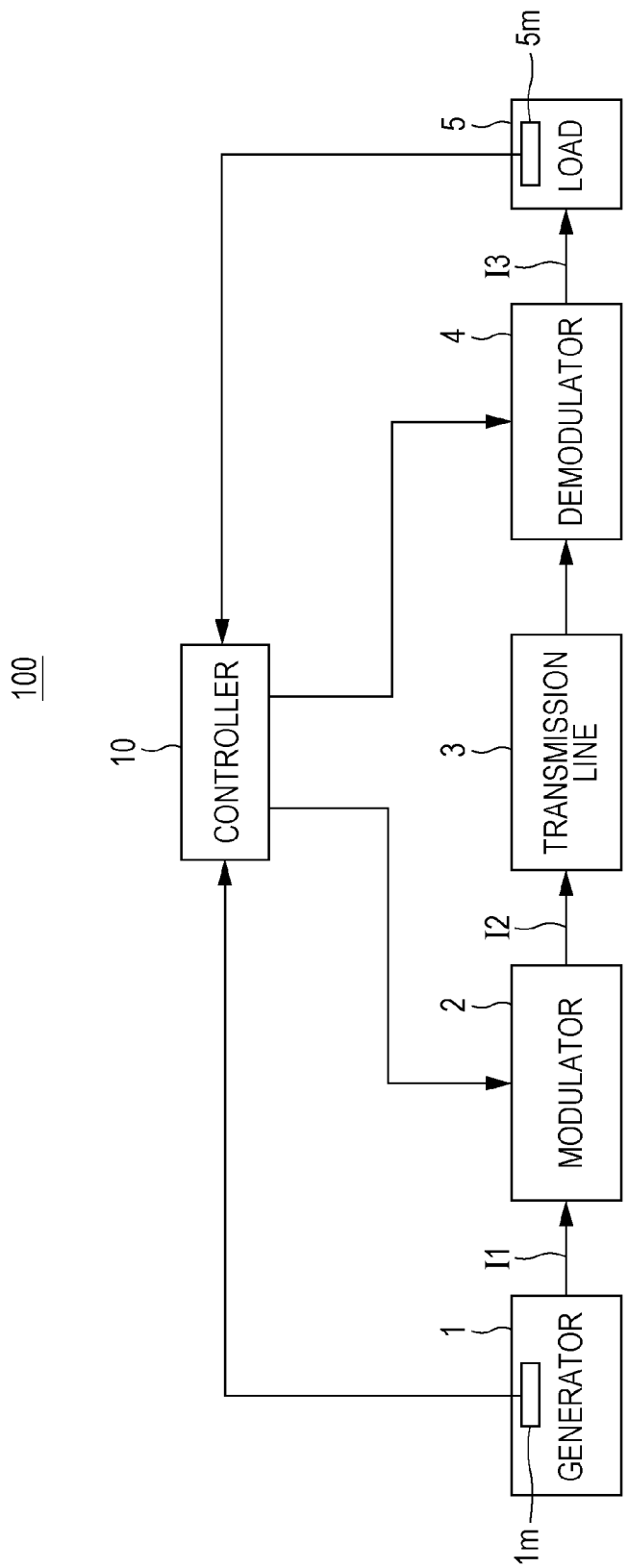

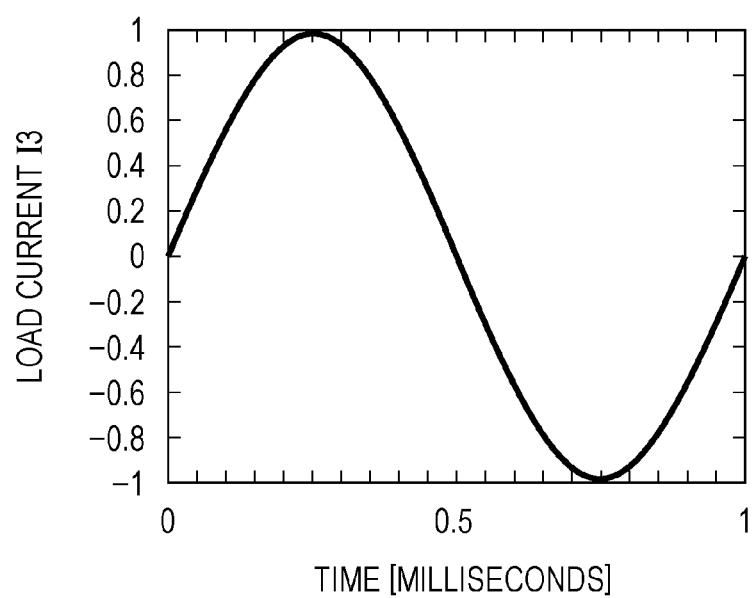

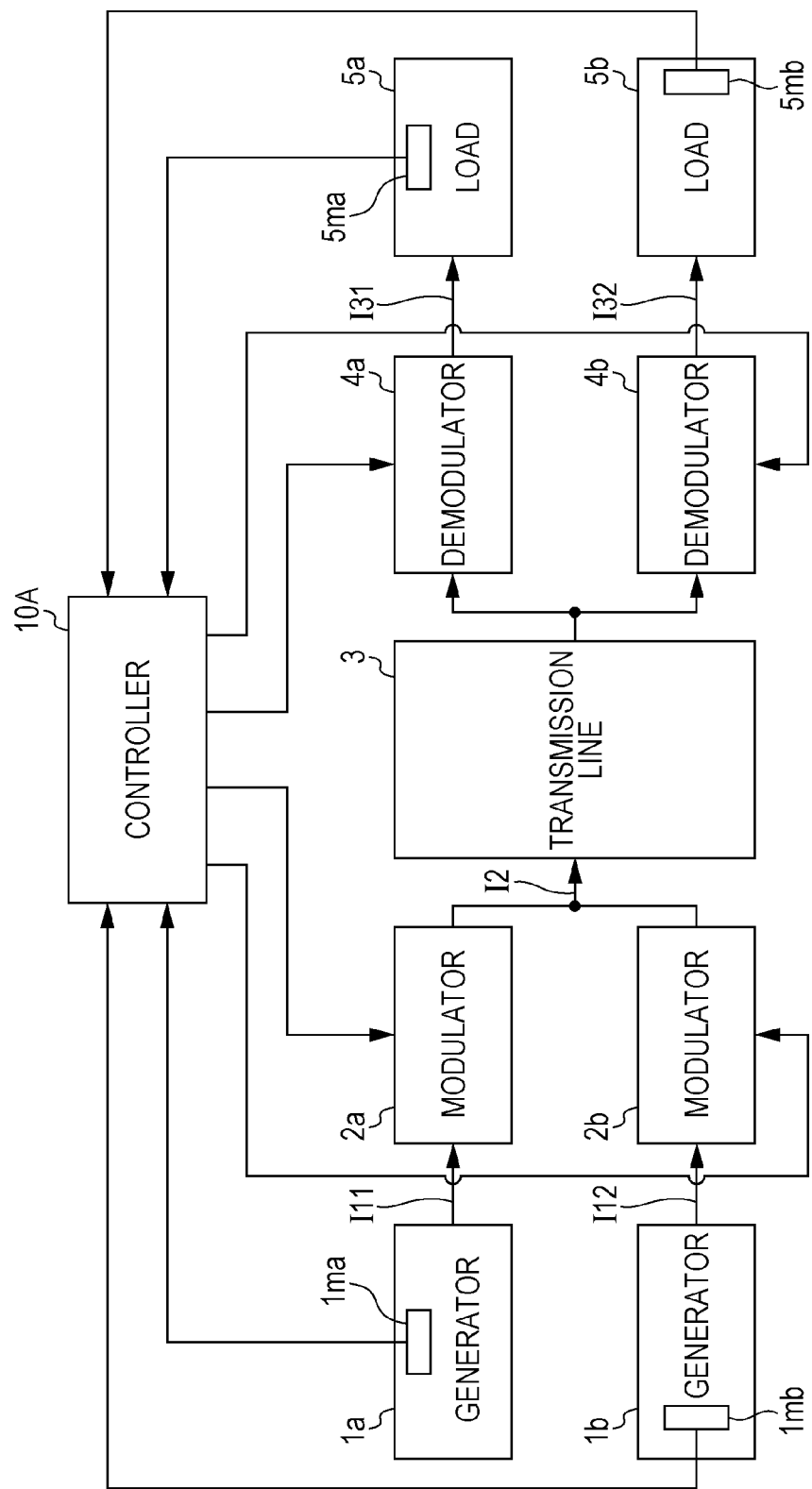

ELECTRIC POWER TRANSMISSION SYSTEM INCLUDING MODULATORS AND DEMODULATORS, AND CONTROLLER

BACKGROUND

1. Technical Field

The present disclosure relates to an electric power transmission system including a modulator and a demodulator.

2. Description of the Related Art

In recent years, the supply of electric power generated by natural energy has been rapidly increasing in addition to the supply of commercial power from electric power companies. Further, in order to reduce loss of electric power by long-distance transmission, the introduction of local small-scale electric power networks has been proposed.

Japanese Patent No. 5612718 discloses a multiterminal electric power conversion apparatus for supplying electric power in an asynchronous manner.

Japanese Unexamined Patent Application Publication No. 2011-91954 discloses an electric power supply apparatus including a communication unit that sends and receives information signals to and from another apparatus and an electric power supply unit that supplies electric power to the another apparatus.

SUMMARY

In one general aspect, the techniques disclosed here feature a system including: a first modulator that modulates a first electric power at a first modulation frequency to generate a first modulated electric power; a second modulator that modulates a second electric power at a second modulation frequency to generate a second modulated electric power; a transmission line through which a transmission power is transmitted, the transmission power being obtained by combining a plurality of modulated electric powers including the first modulated electric power and the second modulated electric power; a first demodulator that demodulates the transmission power at a first demodulation frequency to generate a third electric power, the first demodulation frequency corresponding to the first modulation frequency; and a second demodulator that demodulates the transmission power at a second demodulation frequency to generate a fourth electric power, the second demodulation frequency corresponding to the second modulation frequency. The first modulation frequency and the second modulation frequency is different from each other.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram showing an example configuration of an electric power transmission system according to a first embodiment;

FIG. 3E is a waveform chart showing the waveform of a load current according to the second example of operation of the first embodiment;

FIG. 8 is a block diagram showing an example configuration of an electric power transmission system according to a second embodiment;

DETAILED DESCRIPTION

Figure 2A:
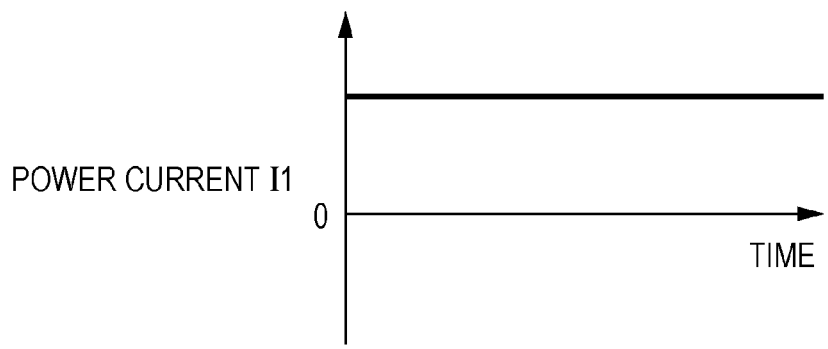
FIG. 2A is a waveform chart showing the waveform of a power current according to a first example of operation of the first embodiment.

In the following, embodiments according to the present disclosure are described with reference to the drawings. It should be noted that, in each of the embodiments below, the same or similar constituent elements may be given the same reference numerals and/or the same names.

All the embodiments that are described below show comprehensive or specific examples. The numerical values, reference numerals, waveforms, types of elements, arrangement and connection of elements, flow of signals, circuit blocks that are shown below are mere examples and, as such, are not intended to limit the present disclosure. In addition, constituent elements that are not recited in an independent claim representing a superordinate concept are optional constituent elements.

First Embodiment

[1. Electric Power Transmission System]

FIG. 1 shows an example configuration of an electric power transmission system 100 according to a first embodiment. The electric power transmission system 100 includes a generator 1, a modulator 2, a transmission line 3, a demodulator 4, a load 5, and a controller 10.

The generator 1 is connected to the modulator 2 as a power source, and the load 5 is connected to the demodulator 4. The modulator 2 has a preset modulation frequency, and the demodulator 4 has a preset demodulation frequency that is the same as the modulation frequency. The modulator 2 modulates, at the modulation frequency, electric power generated by the generator 1 and outputs the modulated electric power to the transmission line 3. The demodulator 4 demodulates, at the demodulation frequency, electric power acquired from the transmission line 3 and outputs the demodulated electric power to the load 5. That is, the modulator 2 functions as an electric power sending apparatus, and the demodulator 4 functions as an electric power receiving apparatus. The transmission line 3 is for example a wired transmission line or a wireless transmission line.

The controller 10 controls the transmission of electric power from the modulator 2 to the demodulator 4. The controller 10 includes a memory in which a program for generating various control signals is stored and a processor that executes the program. The controller 10 for example includes a microcomputer.

The modulation frequency and the demodulation frequency may be fixed values. Alternatively, the modulation frequency and the demodulation frequency may be variable under control of the controller 10. In this case, the controller 10 sends a control signal containing information on the modulation frequency to the modulator 2 and sends a control signal containing information on the demodulation frequency to the demodulator 4. Since the modulation frequency and the demodulator frequency are the same, the modulator 2 and the demodulator 4 perform modulation and demodulation, respectively, in synchronization with each other.

The generator 1 includes an electric power measuring instrument 1$m$. The electric power measuring instrument 1$m$ measures an amount of electricity generated by the generator 1. The load 5 includes an electric power measuring instrument 5$m$. The electric power measuring instrument 5$m$ measures an amount of electric power used by the load 5. The electric power measuring instruments 1$m$ and 5$m$ send information on the amounts of electric power to the controller 10. The controller 10 determines, on the basis of the information, whether the transmission of electric power from the generator 1 to the load 5 is possible, and controls the modulator 2 and the demodulator 4.

The generator 1 may output DC power or may output AC power. An example of a DC generator 1 is a photovoltaic power generator, and an example of an AC generator 1 is a generator based on the rotation of a turbine by thermal power, hydraulic power, wind power, atomic power, or tidal power, for example. The load 5 may receive DC power or may receive AC power. It should be noted that electric power that is transmitted from the modulator 2 to the demodulator 4 through the transmission line 3 is AC power modulated at the modulation frequency.

The term "source power" refers to electric power that is outputted from the generator 1 and/or inputted to the modulator 2. The term "transmission power" refers to electric power that is transmitted through the transmission line 3. The term "load power" refers to electric power that is outputted from the demodulator 4 and/or inputted to the load 5. In FIG. 1, the source power, the transmission power, and the load power are replaced by a power current I1, a transmission current I2, and a load current I3, respectively. The following describes an example in which electric currents are modulated/demodulated. However, the present disclosure is not limited to such an example. For example, voltages may be modulated/demodulated. The term "electric current" used hereinafter may be read as "voltage" or "electric power" as appropriate.

[2. Operation]

The following describes how the electric power transmission system 100 operates in a case where the power current I1 and the load current I3 are direct currents and how the electric power transmission system 100 operates in a case where the power current I1 and the load current I3 are alternating currents.

[2-1. First Example of Operation]

In a first example of operation, a DC power current I1 is inputted to the modulator 2, and a DC load current I3 is outputted from the demodulator 4.

FIGS. 2A to 2E show the waveforms of the power current I1, a reference signal, the transmission current I2, a rectified current, and the load current I3, respectively, in the first example of operation.

The generator 1 generates the DC power current I1 shown in FIG. 2A and outputs it to the modulator 2.

Figure 2B:
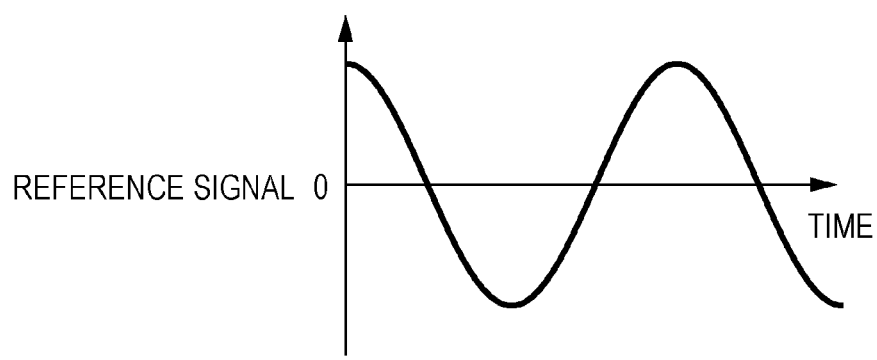
FIG. 2B is a waveform chart showing the waveform of a reference signal according to the first example of operation of the first embodiment.
Figure 2C:
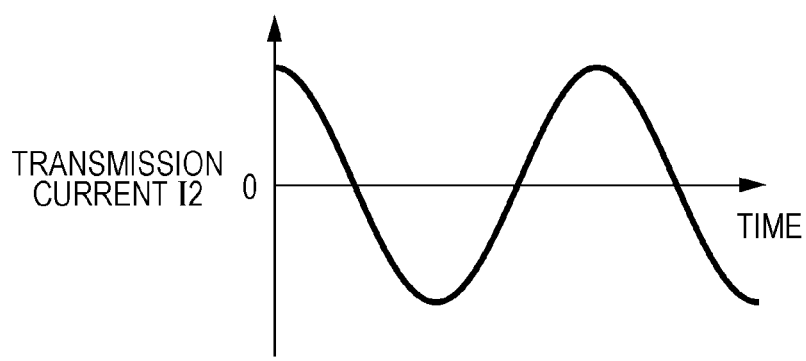
FIG. 2C is a waveform chart showing the waveform of a transmission current according to the first example of operation of the first embodiment.
Figure 2D:
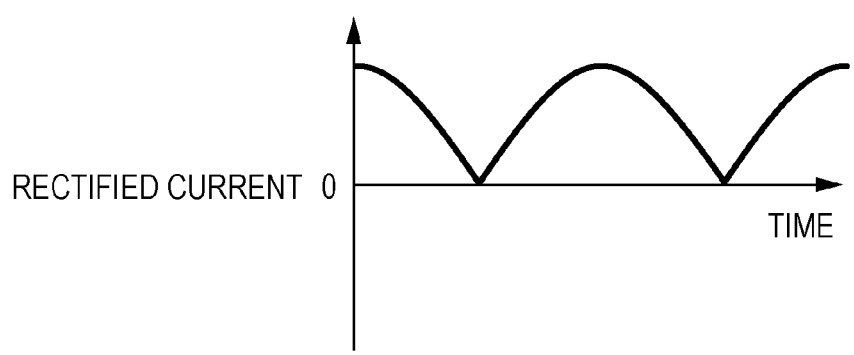
FIG. 2D is a waveform chart showing the waveform of a rectified current according to the first example of operation of the first embodiment.
Figure 2E:
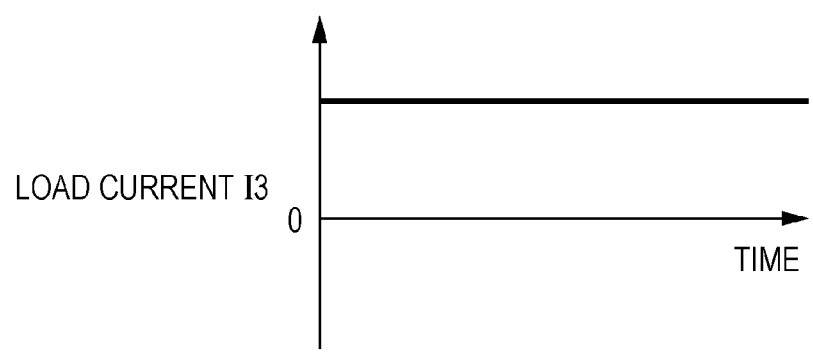
FIG. 2E is a waveform chart showing the waveform of a load current according to the first example of operation of the first embodiment.

The controller 10 sets, as the modulation frequency of the modulator 2, the frequency of the reference signal shown in FIG. 2B. The reference signal is for example a sine wave of 1 kHz. The modulator 2 generates the transmission current I2 (i.e. a modulated current) by amplitude-modulating the power current I1 at the modulation frequency and outputs the transmission current I2 to the transmission line 3. As shown in FIG. 2C, the transmission current I2 has the same waveform as the reference signal.

The controller 10 sets, as the demodulation frequency of the demodulator 4, the frequency of the reference signal shown in FIG. 2B. For example, the demodulator 4 includes a synchronous rectifier circuit and/or a filter. The synchronous rectifier circuit operates at the demodulation frequency and includes a plurality of switches. The filter allows passage of a current component having the same frequency as the demodulation frequency. The demodulator 4 acquires the transmission current I2, which has the same frequency as the demodulation frequency, from the transmission line 3. Note, however, that even if a current component having a frequency that is different from the demodulation frequency is flowing through the transmission line 3, the demodulator 4 does not receive this current component. The demodulator 4 acquires the rectified current shown in FIG. 2D by rectifying the transmission current I2 acquired from the transmission line 3. Next, the demodulator 4 generates the DC load current I3 shown in FIG. 2E by smoothing the rectified current and outputs the DC load current I3 to the load 5.

[2-2. Second Example of Operation]

In a second example of operation, an AC power current I1 is inputted to the modulator 2, and an AC load current I3 is outputted from the demodulator 4. This example assumes a case where the generator 1 generates a sinusoidal current of 1 kHz as the power current I1 and the load 5 acquires a sinusoidal current of 1 kHz as the load current I3.

FIGS. 3A to 3E show the waveforms of the power current I1, a modulating signal, the transmission current I2, a demodulating signal, and the load current I3, respectively, in the second example of operation.

Figure 3A:
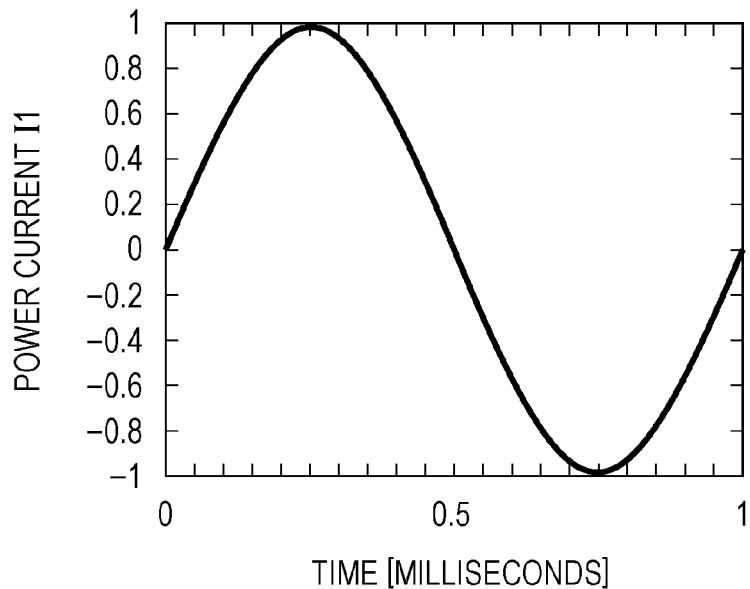
FIG. 3A is a waveform chart showing the waveform of a power current according to a second example of operation of the first embodiment.

The generator 1 generates the AC power current I1 shown in FIG. 3A and outputs it to the modulator 2.

Figure 3B:
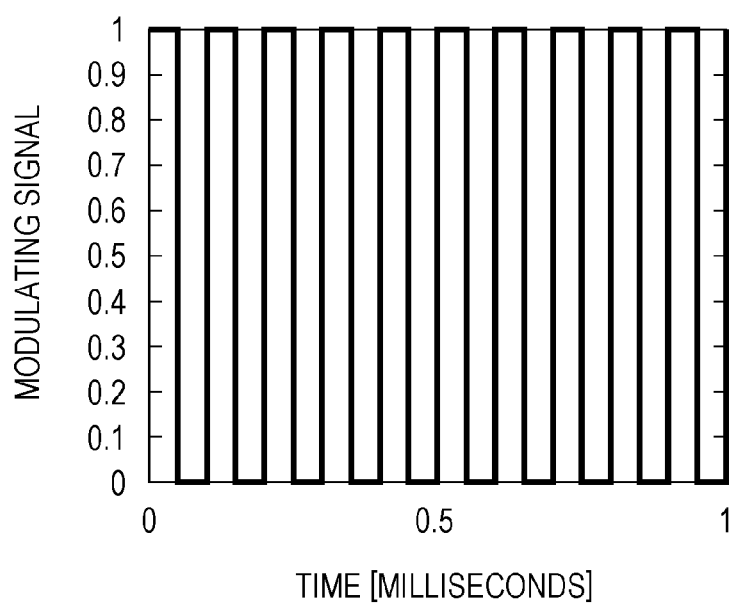
FIG. 3B is a waveform chart showing the waveform of a modulating signal according to the second example of operation of the first embodiment.
Figure 3C:
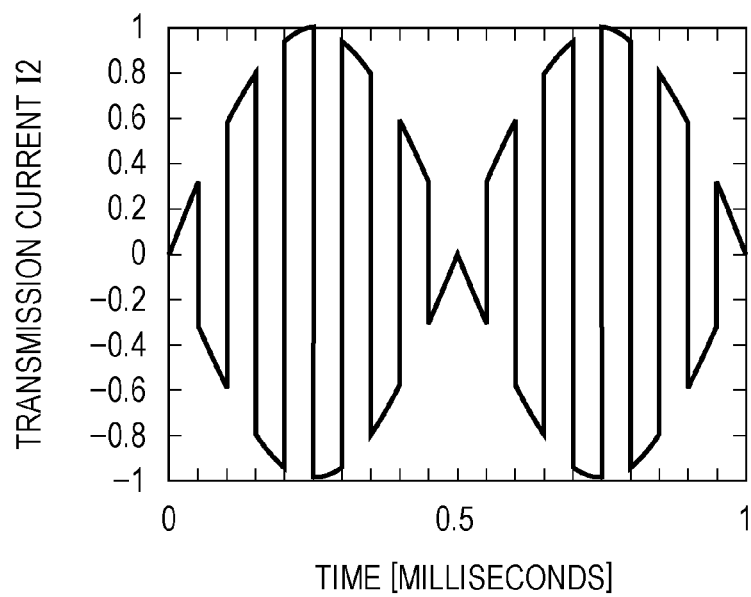
FIG. 3C is a waveform chart showing the waveform of a transmission current according to the second example of operation of the first embodiment.

The controller 10 sets, as the modulation frequency of the modulator 2, the frequency of the modulating signal shown in FIG. 3B. The modulation frequency is higher than the frequency of the power current I1. The modulating signal shown in FIG. 3B is a rectangular wave of 10 kHz. The modulator 2 modulates the power current I1 by inverting the direction of the power current I1 at the modulation frequency, to generate the transmission current I2 shown in FIG. 3C (i.e. a modulated current). The modulator 2 outputs the transmission current I2 to the transmission line 3.

Figure 3D:
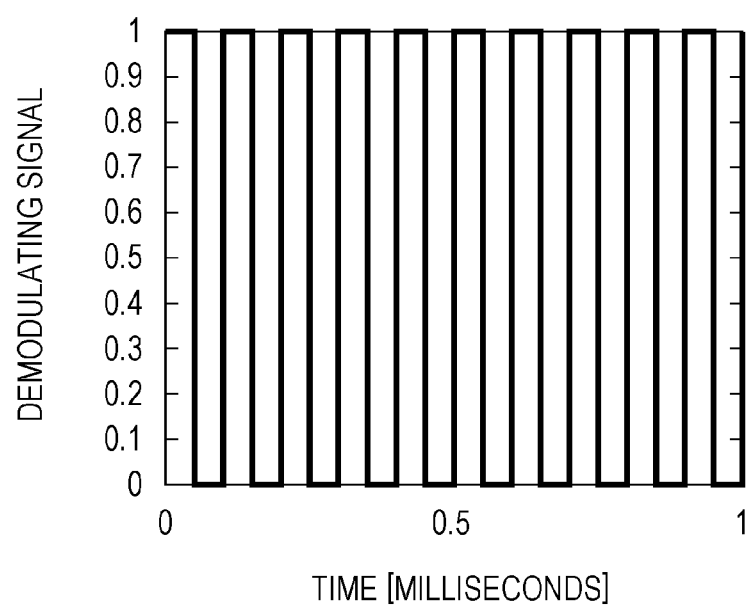
FIG. 3D is a waveform chart showing the waveform of a demodulating signal according to the second example of operation of the first embodiment.

The controller 10 sets, as the demodulation frequency of the demodulator 4, the frequency of the demodulating signal shown in FIG. 3D. The demodulation frequency is equal to the modulation frequency. The demodulating signal shown in FIG. 3E is a rectangular wave of 10 kHz. The demodulator 4 demodulates the transmission current I2 in synchronization with the modulator 2 by inverting the direction of the transmission current I2 at the demodulation frequency, to generate the load current I3 shown in FIG. 3E. The load current I3 has the same waveform as the power current I1. The demodulator 4 supplies the load current I3 to the load 5.

[2-3. Third Example of Operation]

A third example of operation is the same as the second example of operation except that the modulation frequency and the demodulation frequency are different from each other. This example assumes a case where the generator 1 generates a sinusoidal current of 1 kHz as the power current I1 and the load 5 acquires a sinusoidal current of 1 kHz as the load current I3. In this example, the modulating signal is a rectangular wave of 20 kHz, and the demodulating signal is a rectangular wave of 10 kHz.

FIGS. 4A to 4E show the waveforms of the power current I1, a modulating signal, the transmission current I2, a demodulating signal, and the load current I3, respectively, in the third example of operation.

Figure 4A:
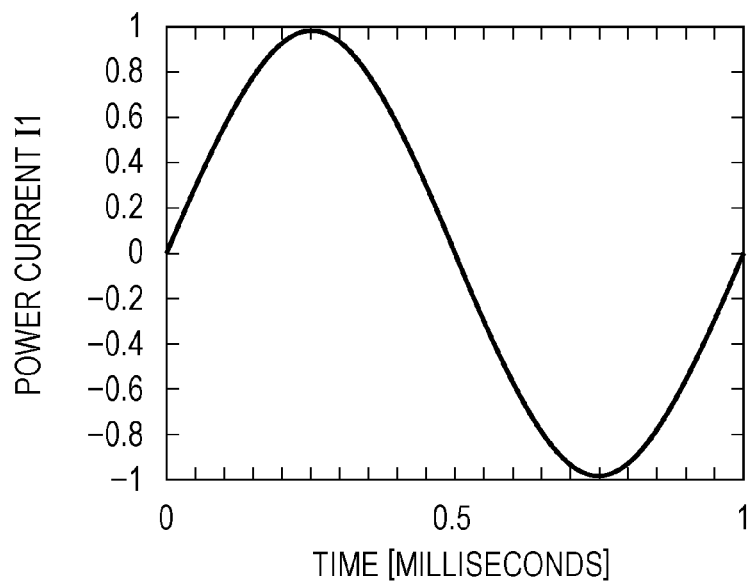
FIG. 4A is a waveform chart showing the waveform of a power current according to a third example of operation of the first embodiment.
Figure 4B:
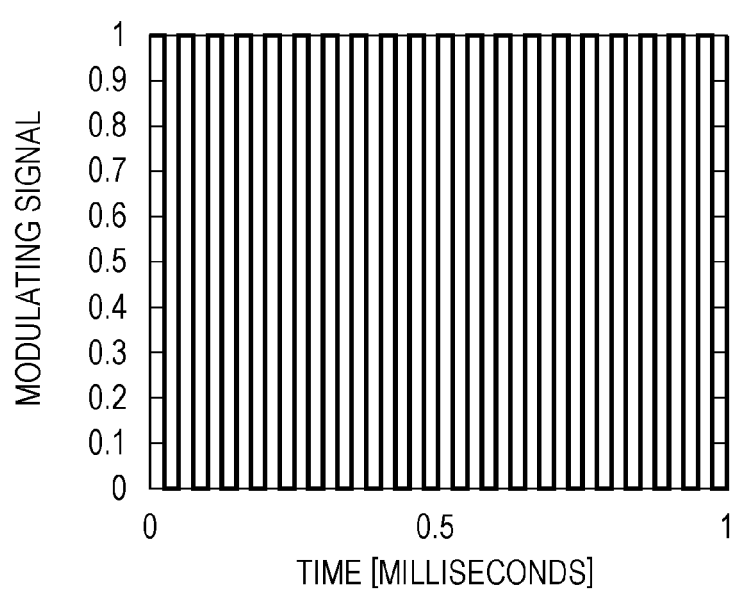
FIG. 4B is a waveform chart showing the waveform of a modulating signal according to the third example of operation of the first embodiment.
Figure 4C:
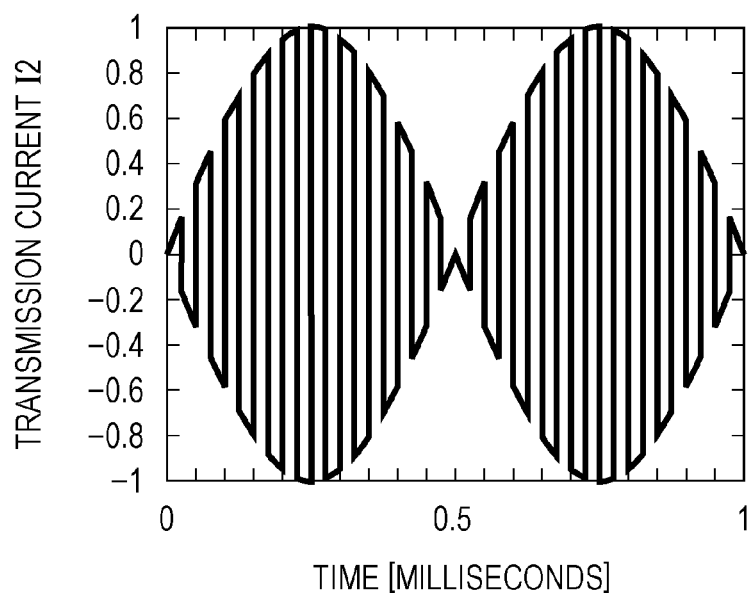
FIG. 4C is a waveform chart showing the waveform of a transmission current according to the third example of operation of the first embodiment.
Figure 4D:
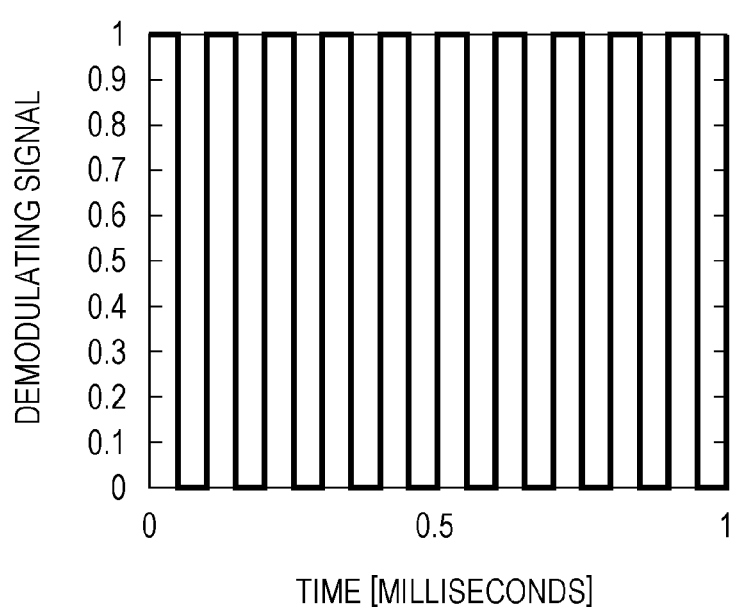
FIG. 4D is a waveform chart showing the waveform of a load current according to the third example of operation of the first embodiment.
Figure 4E:
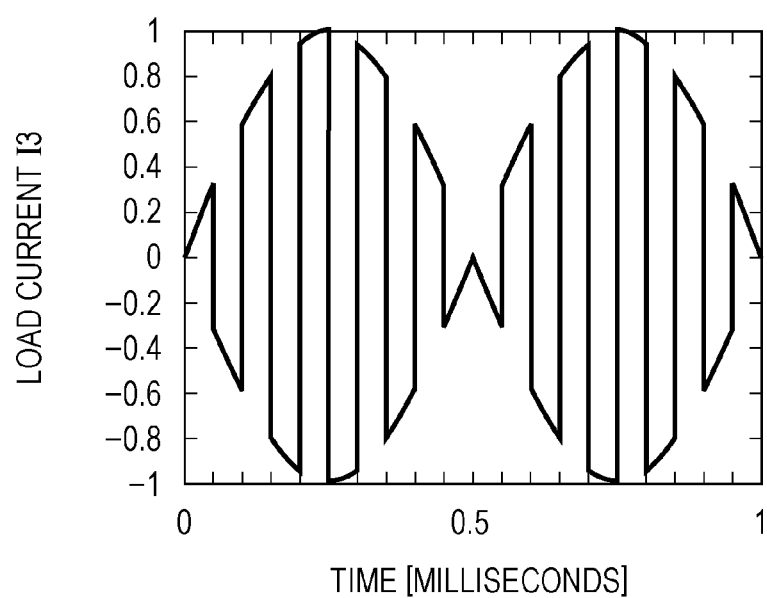
FIG. 4E is a waveform chart showing the waveform of a demodulating signal according to the third example of operation of the first embodiment.

In the third example of operation, the modulator 2 and the demodulator 4 invert the electric currents at different timings, as the modulation frequency and the demodulation frequency are different from each other. Therefore, as shown in FIG. 4E, the load current I3, which has the same frequency as the demodulation frequency, is generated, and the load current I3 cannot bring the load 5 into operation.

When having acquired the transmission current I2 modulated at the modulation frequency (e.g. 20 kHz) that is different from the demodulation frequency (e.g. 10 kHz), the demodulator 4 may stop the supply of electric power to the load 5 without demodulating the transmission current I2. When having received the load current I3 having a frequency (e.g. 10 kHz) that is different from a desired frequency (e.g. 1 kHz), the load 5 may stop the reception of the load current I3 from the demodulator 4.

[3. Circuit Structure of Electric Power Transmission System]

[3-1. First Example Structure]

Figure 5:
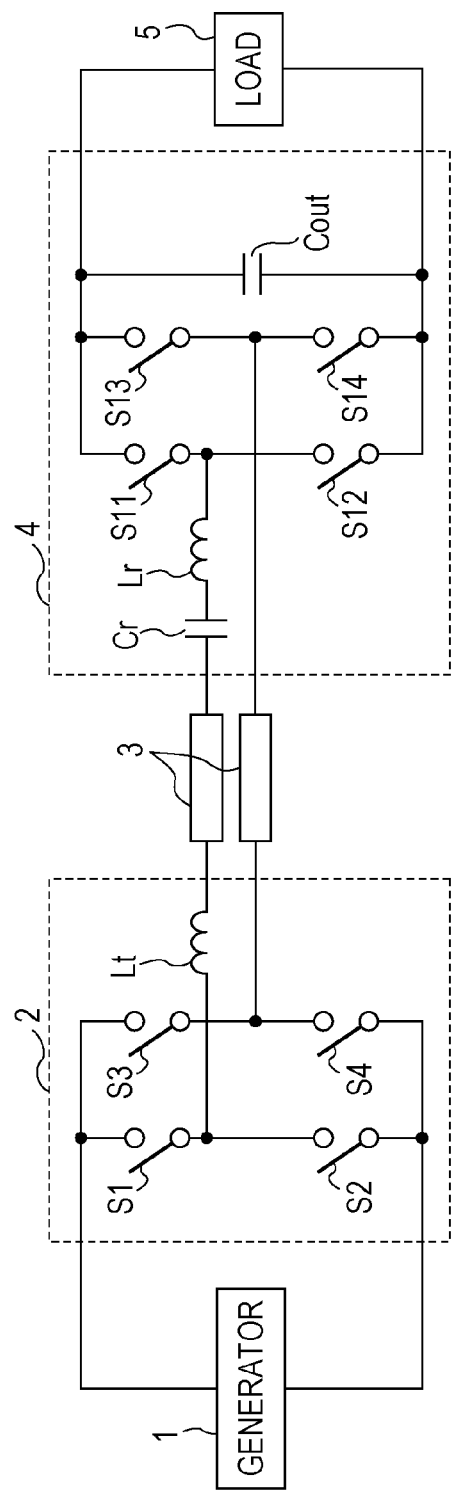
FIG. 5 is a circuit diagram showing an example structure of the electric power transmission system according to the first embodiment.

FIG. 5 is a circuit diagram showing a first example structure of the electric power transmission system 100. For simplicity of illustration, FIG. 5 omits to show the electric power measuring instruments 1*m* and 5*m* and the controller 10.

The modulator 2 includes switches S1 to S4 and an inductor Lt. The demodulator 4 includes switches S11 and S14, capacitors Cr and Cout, and an inductor Lr.

In the electric power transmission system 100 shown in FIG. 5, for example, DC source power is inputted to the modulator 2, and DC load power is outputted from the demodulator 4. The modulator 2 modulates the DC source power, which was generated by the generator 1, by turning on and off the switches S1 to S4. The modulator 2 modulates the DC power, for example, by using pulse width modulation. The inductor Lt of the modulator 2 inhibits electric power from flowing from another electric power sending apparatus, if any, connected to the transmission line 3 into the modulator 2. The capacitor Cr and inductor Lr of the demodulator 4 constitute an LC resonant circuit that resonates at the demodulation frequency. The switches S11 to S14 constitute a synchronous rectifier circuit that operates at the demodulation frequency. The demodulator 4 acquires electric power having the same frequency as the demodulation frequency from the transmission line 3 via the LC resonant circuit. The demodulator 4 rectifies the acquired electric power by turning on and off the switches S11 to S14, thereby generating rectified power. The demodulator 4 then generates DC load power by smoothing the rectified power via the capacitor Cout and outputs the DC load power to the load 5.

The transmission line 3 has a predetermined capacitance and a predetermined inductance. For example, in a case where the transmission line 3 is a wired transmission line, the inductance of the transmission line 3 becomes higher as the wired transmission line becomes longer. Therefore, the determination of the capacitance of the capacitor Cr and the inductance of the inductor Lr may take into account variations in capacitance and inductance by the transmission line 3. The system's resonant frequency f0 is expressed, for example, by equation (1) as follows:

$$f0 = 1/(2\pi(C0+Cr) \times (L0+Lr))) \quad (1)$$

where Cr is the capacitance of the capacitor Cr, Lr is the inductance of the inductor Lr, C0 is the variation in capacitance by the transmission line 3, and L0 is the variation in inductance by the transmission line 3.

In a case where the demodulation frequency is set as f0, the capacitance of the capacitor Cr and the inductance of the inductor Lr can be determined according to equation (1). This makes it possible to transmit electric power with high efficiency according to the capacitance and inductance of the transmission line 3.

In a case where the demodulator 4 is a synchronous rectifier circuit that operates at the demodulation frequency, the LC resonant circuit of the capacitor Cr and the inductor Lr may be omitted.

In the electric power transmission system 100 shown in FIG. 5, for example, AC source power may be inputted to the modulator 2, and AC load power may be outputted from the demodulator 4. In this case, the capacitor Cout of the demodulator 4 is eliminated.

In the electric power transmission system 100 shown in FIG. 5, the capacitor Cr of the demodulator 4 may have a variable capacitance. The capacitor Cr may for example be a varistor whose capacitance varies under control of the controller 10. In this case, the controller 10 can dynamically change the demodulation frequency. This allows the demodulator 4 to acquire electric power modulated at various different modulation frequencies.

[3-2. Second Example Structure]

Figure 6:
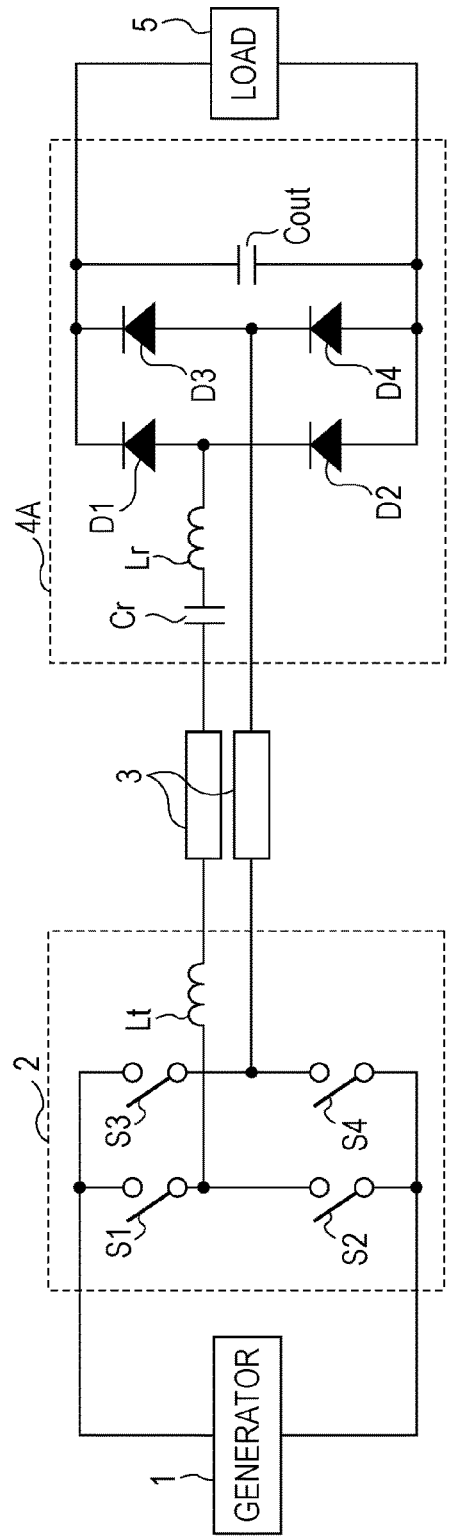
FIG. 6 is a circuit diagram showing another example structure of the electric power transmission system according to the first embodiment.

FIG. 6 is a circuit diagram showing a second example structure of the electric power transmission system 100. For simplicity of illustration, FIG. 6, too, omits to show the electric power measuring instruments 1m and 5m and the controller 10.

The circuit shown in FIG. 6 includes a demodulator 4A instead of the demodulator 4 shown in FIG. 5. The demodulator 4A includes diodes D1 to D4. In a case where DC power is outputted from the demodulator 4A, the demodulator 4A may be a bridge circuit that includes the diodes D1 to D4. In this case, the controller 10 may not need to control the demodulator 4A, provided the demodulation frequency of the demodulator 4A is fixed. Therefore, the configuration and operation of the electric power transmission system 100 can be simplified.

[3-3. Comparative Example]

The electric power transmission system 100 is described here in comparison with a signal transmission system in a typical communication circuit.

Figure 7:
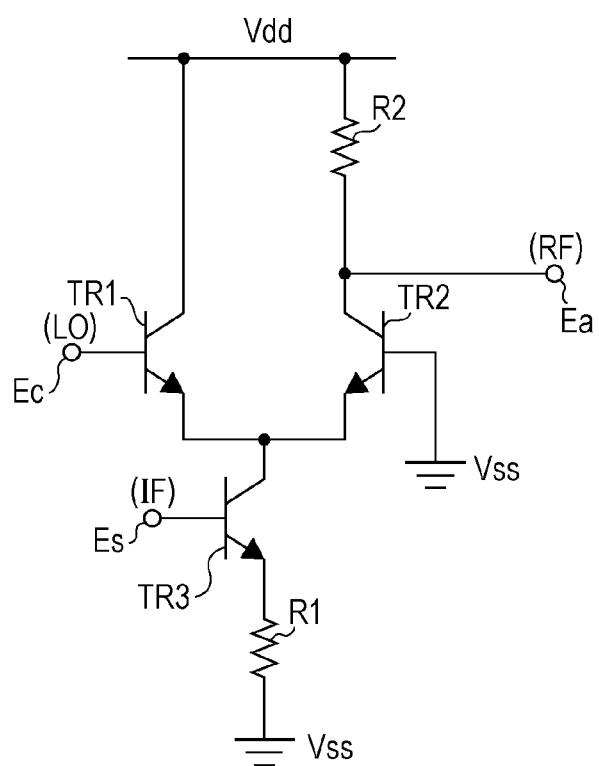
FIG. 7 is a circuit diagram showing a multiplier of a comparative example.

In a typical communication circuit, modulation and demodulation of electric signals are performed by multiplication of the electric signals. FIG. 7 shows a multiplier according to a comparative example. The multiplier shown in FIG. 7 is a mixing circuit. The multiplier of FIG. 7 includes transistors TR1 to TR3, resistors R1 and R2, and terminals Ec, Es, and Ea. A local oscillation signal (LO) is applied from the terminal Ec. An intermediate frequency signal (IF) is applied from the terminal Es. A radio-frequency signal (RF) is applied from the terminal Ea.

At the time of modulation, the multiplier for example multiplies an DC baseband signal and an AC modulating signal sin(ot), thereby generating a transmission signal having the same frequency as the modulating signal. Note here that the frequency f of the modulating signal satisfies $\omega = 2\pi f$ and is for example 1 kHz.

At the time of demodulation, the multiplier multiplies the transmission signal and a demodulating signal sin(ωt), thereby generating a demodulated transmission signal 1+sin(2ωt). The first term "1" of the demodulated transmission signal is a DC current. The second term "sin(2ωt)" of the demodulated transmission signal is 0 when integrated by the period of the modulating signal. Therefore, the modulated transmission signal is smoothed by being integrated by the period of the modulating signal, and thus only the current before modulation can be taken out.

Use of the multiplier of FIG. 7 makes it possible to generate a signal obtained by multiplying two input signals. However, this multiplier does not convert the energy of an input signal into output power but generates output power by using energy acquired from another power source. As such, the multiplier according to the comparative example cannot be used in an electric power transmission system that transmits inputted electric power.

Meanwhile, as shown in FIGS. 5 and 6, the electric power transmission system 100 according to the first embodiment modulates electric power by using the switches S1 to S4 and demodulates electric power by using the switches S11 to S14 or the diodes D1 to D4. This allows electric power inputted from the generator 1 to be outputted to the transmission line 3 and allows electric power acquired from the transmission line 3 to be outputted to the load 5.

[4. Advantageous Effects]

As described above, the electric power transmission system according to the first embodiment makes it possible to transmit electric power from the generator 1 to the load 5 through the transmission line 3 by making the modulation frequency and the demodulation frequency equal.

[5. Modifications]

The electric power transmission system 100 according to the first embodiment further has the following modifications.

The electric power measuring instrument 1*m* may be provided in a stage preceding the modulator 2 instead of being provided in the generator 1. The electric power measuring instrument 5*m* may be provided in a stage following the demodulator 4 instead of being provided in the demodulator 4.

The generator 1 or the load 5 may be an electric storage device such as a battery or a capacitor. By including the electric storage device, the electric power transmission system 100 can make effective use of electric power generated in a time period during which no or little electric power is consumed. This can improve overall power efficiency.

Although FIG. 2B shows a sine-wave modulating signal and FIGS. 3B and 3D show rectangular-wave modulating and demodulating signals, the waveforms of modulating and demodulating signals are not limited to these waveforms. The electric power transmission system 100 may use modulating and demodulating signals of any waveforms.

The electric power transmission system 100 may modulate and demodulate voltages.

Second Embodiment

[1. Electric Power Transmission System]

FIG. 8 shows an example configuration of an electric power transmission system 100A according to a second embodiment.

The electric power transmission system 100A includes generators 1*a* and 1*b*, modulators 2*a* and 2*b*, a transmission line 3, demodulators 4*a* and 4*b*, loads 5*a* and 5*b*, and a controller 10A. The electric power transmission system 100A performs electric power transmission with a desired combination from among the plurality of generators 1*a* and 1*b* and the plurality of loads 5*a* and 5*b*.

The generators 1*a* and 1*b* are connected to the modulators 2*a* and 2*b* as power sources, respectively, and the loads 5*a* and 5*b* are connected to the demodulators 4*a* and 4*b*, respectively. The modulator 2*a* has a preset first modulation frequency, and the demodulator 4*a* has a preset first demodulation frequency that is the same as the first modulation frequency. The modulator 2*b* has a preset second modulation frequency that is different from the first modulation frequency, and the demodulator 4*b* has a preset second demodulation frequency that is the same as the second modulation frequency. The modulator 2*a* modulates, at the first modulation frequency, electric power generated by the generator 1*a* and outputs the modulated electric power to the transmission line 3. The demodulator 4*a* demodulates, at the first demodulation frequency, electric power acquired from the transmission line 3 and outputs the demodulated electric power to the load 5*a*. The modulator 2*b* modulates, at the second modulation frequency, electric power generated by the generator 1*b* and outputs the modulated electric power to the transmission line 3. The demodulator 4*b* demodulates, at the second demodulation frequency, electric power acquired from the transmission line 3 and outputs the demodulated electric power to the load 5*b*. That is, the modulators 2*a* and 2*b* function as electric power sending apparatuses, and the demodulators 4*a* and 4*b* function as electric power receiving apparatuses. The transmission line 3 is for example a wired transmission line.

The first and second modulation frequencies and the first and second demodulation frequencies may be fixed values. Alternatively, the first and second modulation frequencies and the first and second demodulation frequencies may be changeable by the controller 10A. In this case, the controller 10A sends a control signal containing information on the first modulation frequency to the modulator 2*a* and sends a control signal containing information on the first demodulation frequency to the demodulator 4*a*. Since the first modulation frequency and the first demodulator frequency are the same, the modulator 2*a* and the demodulator 4*a* perform modulation and demodulation, respectively, in synchronization with each other. The controller 10A sends a control signal containing information on the second modulation frequency to the modulator 2*b* and sends a control signal containing information on the second demodulation frequency to the demodulator 4*b*. Since the second modulation frequency and the second demodulator frequency are the same, the modulator 2*b* and the demodulator 4*b* perform modulation and demodulation, respectively, in synchronization with each other.

The generators 1*a* and 1*b* and the loads 5*a* and 5*b* include electric power measuring instruments 1*ma*, 1*mb*, 5*ma*, and 5*mb*, respectively. The electric power measuring instruments 1*ma*, 1*mb*, 5*ma*, and 5*mb* measure amounts of electric power and send them to the controller 10A. The controller 10A controls, on the basis of information on the amounts of electric power, the modulators 2*a* and 2*b* and the demodulators 4*a* and 4*b*. This allows electric power to be flexibly supplied between electric power systems of the modulators 2*a* and 2*b* and the demodulators 4*a* and 4*b*.

The generators 1*a* and 1*b* may output DC power or may output AC power. The loads 5*a* and 5*b* may receive DC power or may receive AC power. It should be noted that electric power that is transmitted from the modulators 2*a* and 2*b* to the demodulators 4*a* and 4*b* through the transmission line 3 is AC power modulated at the modulation frequencies, respectively.

The term "first source power" refers to electric power that is outputted from the generator 1*a* and/or inputted to the modulator 2*a*. The term "second source power" refers to electric power that is outputted from the generator 1*b* and/or inputted to the modulator 2*b*. The term "transmission power" refers to electric power that is transmitted through the transmission line 3. The term "first load power" refers to electric power that is outputted from the demodulator 4*a* and/or inputted to the load 5*a*. The term "second load power" refers to electric power that is outputted from the demodulator 4*b* and/or inputted to the load 5*b*.

In FIG. 8, the first source power, the second source power, the transmission power, and the first load power, and the second load power are replaced by a power current I11, a power current I12, a transmission current I2, a load current I31, and a load current I32, respectively. The following describes an example in which electric currents are modulated/demodulated. However, the present disclosure is not limited to such an example. For example, voltages may be modulated/demodulated. The term "electric current" used hereinafter may be read as "voltage" or "electric power" as appropriate.

[2. Operation]

An example of operation of the electric power transmission system 100A is described. In the present example of operation, electric power is transmitted from the generator 1*a* to the load 5*a*, and electric power is transmitted from the generator 1*b* to the load 5*b*. Specifically, DC power currents I11 and I12 are inputted to the modulators 2*a* and 2*b*, respectively, and DC load currents I31 and I32 are outputted from the demodulators 4a and 4b, respectively.

FIGS. 9A to 9G show the waveforms of the power current I11, the power current I12, a modulating signal of the modulator 2a, a modulating signal of the modulator 2b, the transmission current I2, the load current I31, and the load current I32, respectively, in the present example of operation.

Figure 9A:
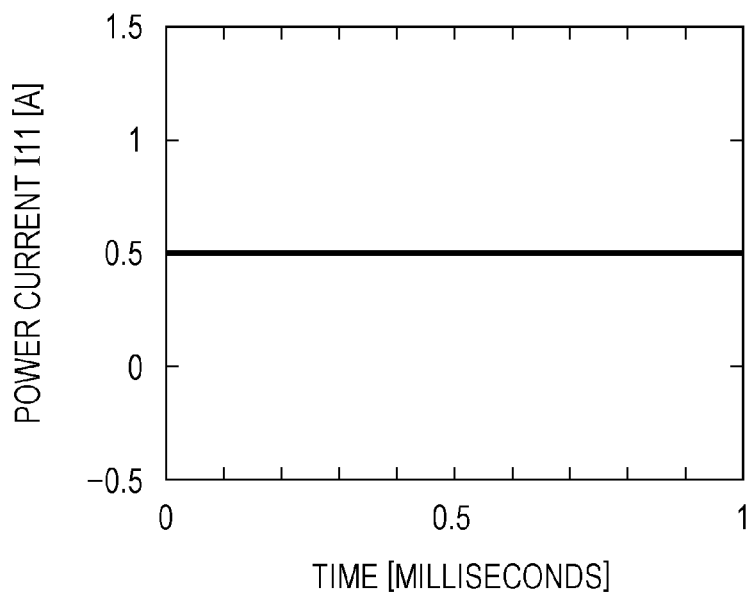
FIG. 9A is a waveform chart showing the waveform of a first power current according to an example of operation of the second embodiment.

The generator 1a generates the DC power current I11 of 0.5 A shown in FIG. 9A and outputs it to the modulator 2a.

Figure 9B:
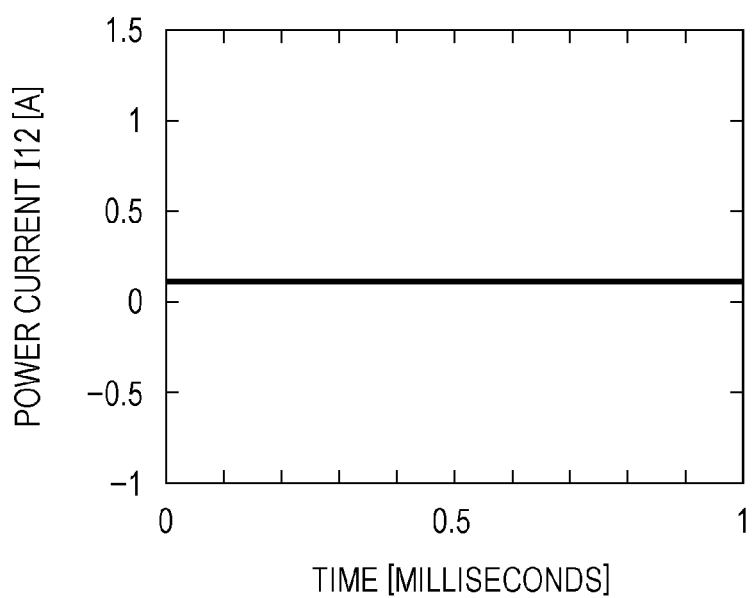
FIG. 9B is a waveform chart showing the waveform of a second power current according to the example of operation of the second embodiment.
Figure 9C:
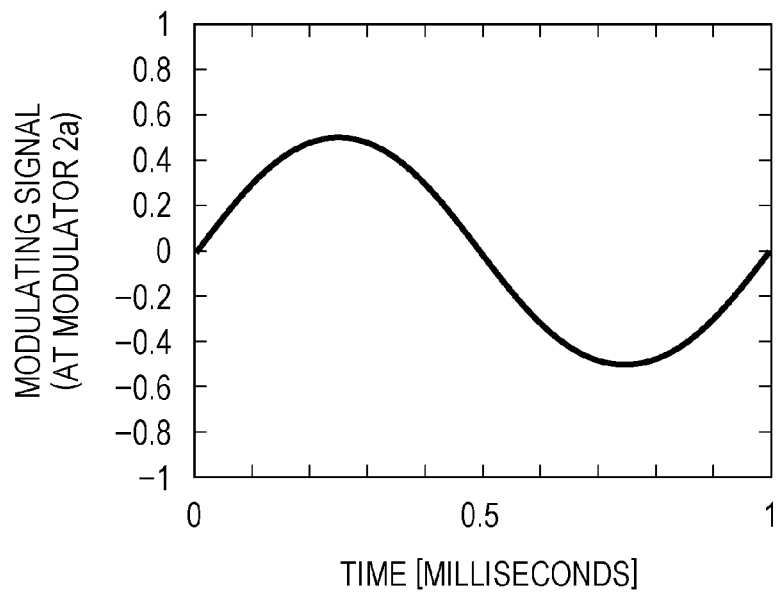
FIG. 9C is a waveform chart showing the waveform of a first modulating signal according to the example of operation of the second embodiment.

The controller 10A sets, as the first modulation frequency of the modulator 2a, the frequency of the sine wave of 1 kHz shown in FIG. 9C. The modulator 2a amplitude-modulates the power current I11 at the first modulation frequency and outputs the modulated electric current to the transmission line 3.

The generator 1b generates the DC power current I12 of 0.1 A shown in FIG. 9B and outputs it to the modulator 2b.

Figure 9D:
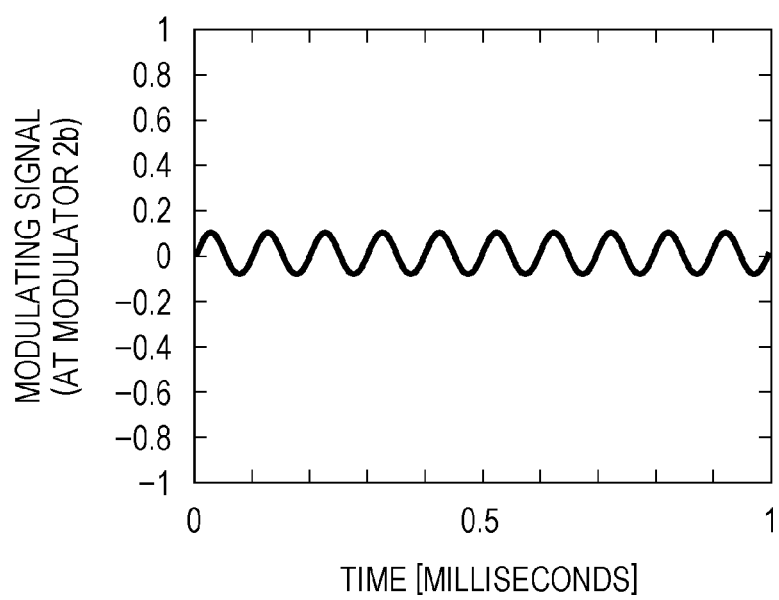
FIG. 9D is a waveform chart showing the waveform of a second modulating signal according to the example of operation of the second embodiment.

The controller 10A sets, as the second modulation frequency of the modulator 2b, the frequency of the sine wave of 10 kHz shown in FIG. 9D. The modulator 2b amplitude-modulates the power current I12 at the second modulation frequency and outputs the amplitude-modulated electric current to the transmission line 3.

Figure 9E:
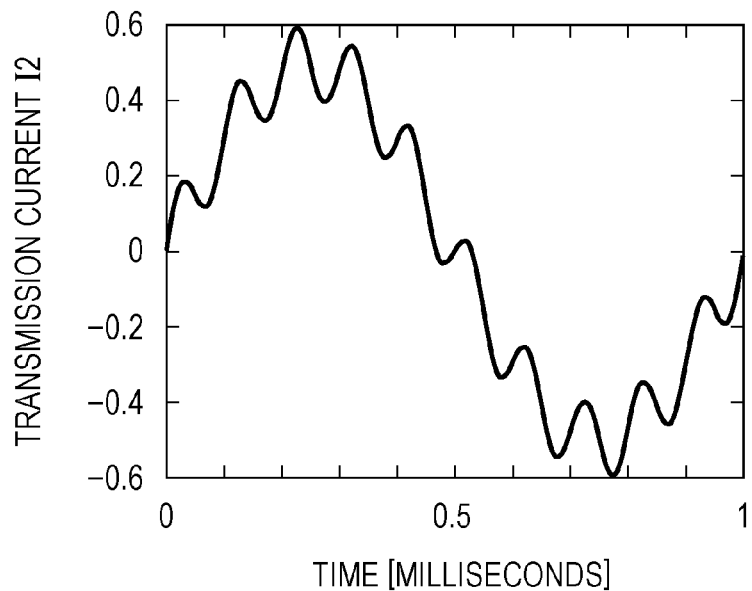
FIG. 9E is a waveform chart showing the waveform of a transmission current according to the example of operation of the second embodiment.
Figure 9F:
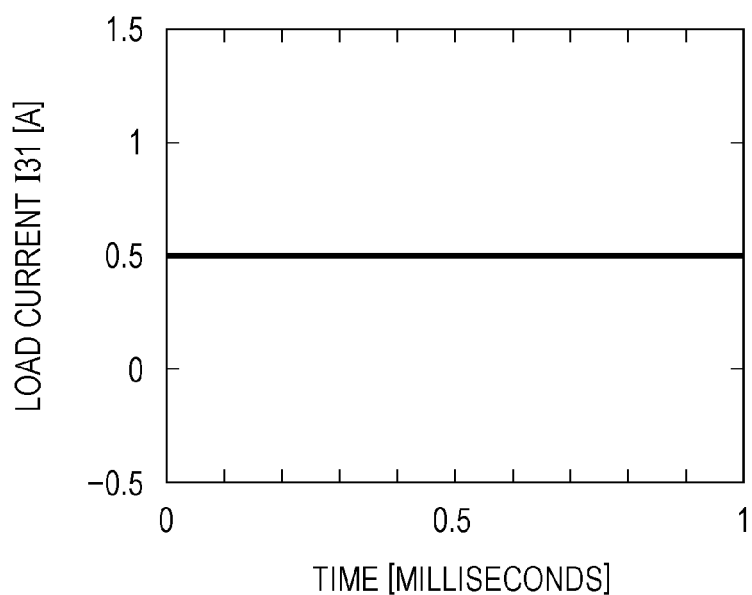
FIG. 9F is a waveform chart showing the waveform of a first load current according to the example of operation of the second embodiment.
Figure 9G:
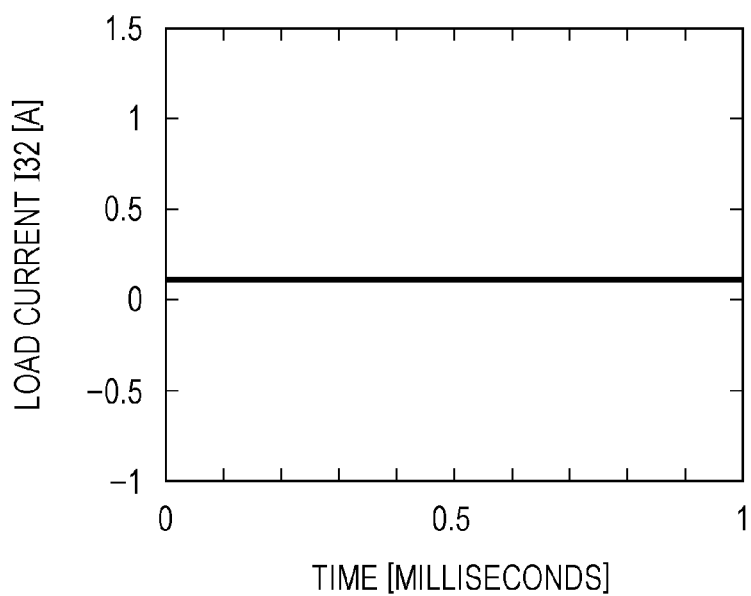
FIG. 9G is a waveform chart showing the waveform of a second load current according to the example of operation of the second embodiment.

The electric currents outputted from the modulators 2a and 2b are combined in the transmission line 3, and the combined electric currents flow as the transmission current I2 shown in FIG. 9E. As shown in FIG. 9E, the waveform of the transmission current I2 has a range of amplitude of −0.6 A to +0.6 A.

The controller 10A sets, as the first demodulation frequency of the demodulator 4a, a frequency that is the same as the first modulation frequency. The demodulator 4a acquires, from the transmission line 3, a current component of the transmission current I2 that has the same frequency (i.e. 1 kHz) as the first demodulation frequency. The demodulator 4a rectifies and smooths the acquired current component to generate the DC load current I31 of 0.5 A shown in FIG. 9F, and outputs it to the load 5a.

The controller 10A sets, as the second demodulation frequency of the demodulator 4b, a frequency that is the same as the second modulation frequency. The demodulator 4b acquires, from the transmission line 3, a current component of the transmission current I2 that has the same frequency (i.e. 10 kHz) as the second demodulation frequency. The demodulator 4b rectifies and smooths the acquired current component to generate the DC load current I32 of 0.1 A shown in FIG. 9G, and outputs it to the load 5b.

FIGS. 9A to 9G show that modulation and demodulation are properly done in the electric power transmission system 100A, that electric power generated by the generator 1a is transmitted to the load 5a, and that electric power generated by the generator 1b is transmitted to the load 5b.

[3. Advantageous Effects]

In the electric power transmission system 100A, the first modulation frequency and the first demodulation frequency are different from the second modulation frequency and the second demodulation frequency. This makes it possible to transmit desired electric power from at least one generator selected from among a plurality of generators to at least one load selected from among a plurality of loads. Even if a current component having the second modulation frequency is flowing through the transmission line 3, the demodulator 4a does not receive this current component, and even if a current component having the first modulation frequency is flowing through the transmission line 3, the demodulator 4b does not receive this current component.

According to the electric power transmission system 100A, electric powers from the plurality of generators 1a and 1b are concurrently transmitted through one transmission line 3 in a multiplexed state and these electric powers are separated and sent to the plurality of loads 5a and 5b, respectively.

The controller 10A can dynamically change the supply of electric power between the plurality of generators 1a and 1b and the plurality of loads 5a and 5b.

Since a plurality of different electric powers are transmitted through the common transmission line 3, the transmission line 3 can be simplified. For example, in a case where the transmission line 3 includes cables, the number of cables can be reduced.

Since a plurality of modulated electric powers are combined and concurrently transmitted, the transmission time can be shortened, for example, than in the case of a scheme in which electric powers of a plurality of systems are transmitted in a time-division manner. Since the electric powers are separable according to frequencies, an electric power transmission can be performed without influence on another electric power transmission.

Any modulation frequency can be set for each of the modulators 2a and 2b, and any demodulation frequency can be set for each of the demodulators 4a and 4b. This makes it possible to flexibly change pairing between a modulator and a demodulator according to any combination of a modulation frequency and a demodulation frequency. For example, the transmission of electric power from the generator 1b to the load 5b and the transmission of electric power from the generator 1b to the load 5a may be concurrently executed. Even with an increase in the number of patterns of pairing, an increase in circuit size can be suppressed. This makes it possible to achieve electric power transmission with small-sized apparatuses.

[4. Circuit Structure of Electric Power Transmission System]

[4-1. First Example Structure]

Figure 10:
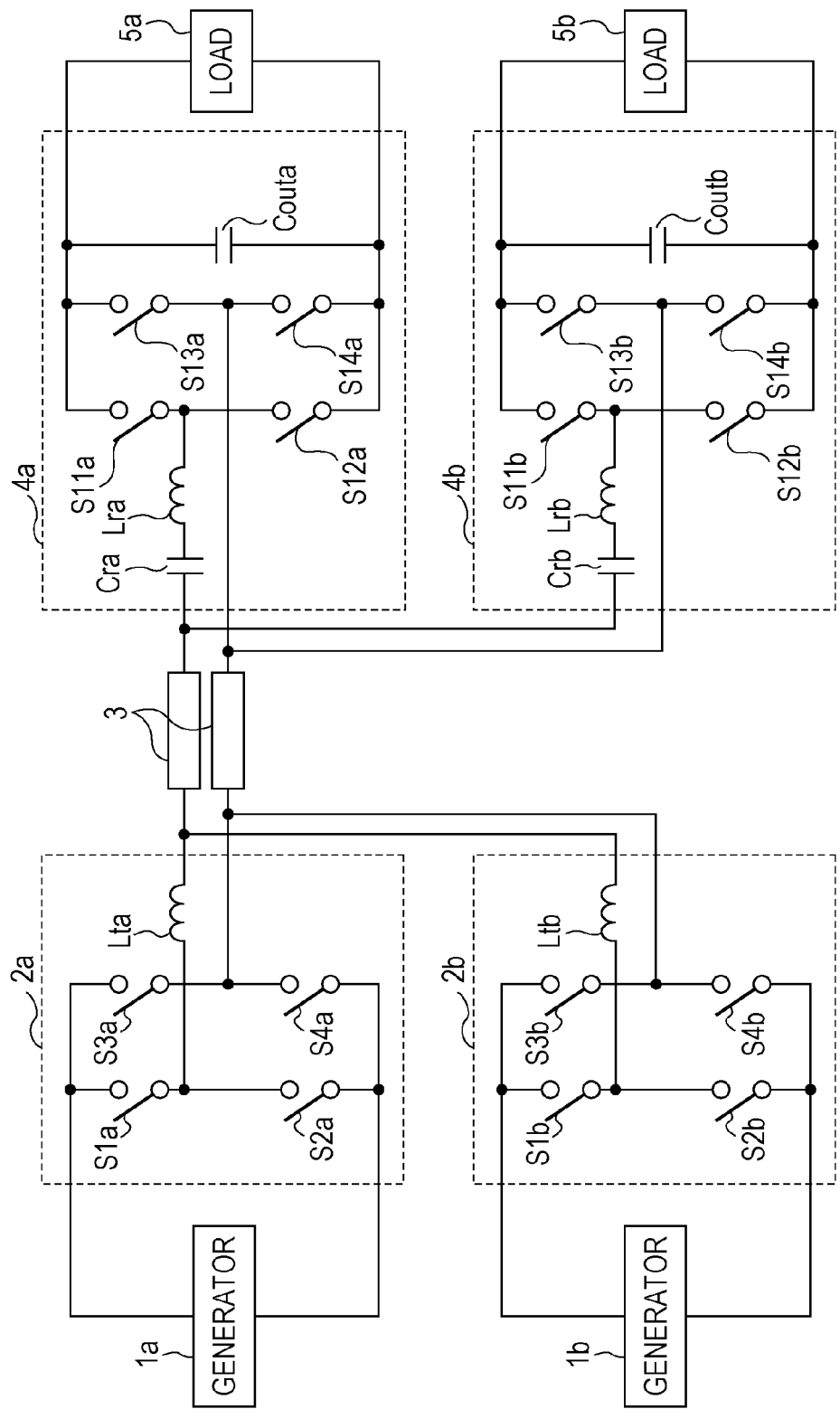
FIG. 10 is a circuit diagram showing an example structure of the electric power transmission system according to the second embodiment.

FIG. 10 is a circuit diagram showing a first example structure of the electric power transmission system 100A. For simplicity of illustration, FIG. 10 omits to show the electric power measuring instruments 1ma, 1mb, 5ma, and 5mb and the controller 10A.

Each of the modulators 2a and 2b is identical in configuration to the modulator 2 shown in FIG. 5, and each of the demodulators 4a and 4b is identical in configuration to the demodulator 4 shown in FIG. 5. Constituent elements of the modulator 2a and constituent elements of the modulator 2b are distinguished by adding "a" or "b" to the end of each of the reference numerals. Constituent elements of the demodulator 4a and constituent elements of the demodulator 4b are distinguished by adding "a" or "b" to the end of each of the reference numerals.

The capacitance of the capacitor Cra and the inductance of the inductor Lra are set so that an LC resonant circuit including the capacitor Cra and the inductor Lra resonates at the first demodulation frequency. The capacitance of the capacitor Crb and the inductance of the inductor Lrb are set so that an LC resonant circuit including the capacitor Crb and the inductor Lrb resonates at the second demodulation frequency. The first demodulation frequency is different from the second demodulation frequency. The first demodulation frequency and the second demodulation frequency are set so that there is a sufficient difference in input impedance between the demodulators 4a and 4b.

In a case where the demodulator 4a is a synchronous rectifier circuit that operates at the first demodulation frequency, the LC resonant circuit of the capacitor Cra and the inductor Lra may be omitted. Similarly, in a case where the demodulator 4b is a synchronous rectifier circuit that operates at the second demodulation frequency, the LC resonant circuit of the capacitor Crb and the inductor Lrb may be omitted.

In a case where the first modulation frequency and the second modulation frequency are integral multiples of each other, a current component of the transmission current I2 modulated by the modulator 2a is orthogonal to a current component of the transmission current I2 modulated by the modulator 2b according to the same principal as orthogonal frequency division multiplexing. Therefore, even without including LC resonant circuits, the demodulators 4a and 4b allow electric powers from the modulators 2a and 2b to be separated.

[4-2. Second Example Structure]

Figure 11:
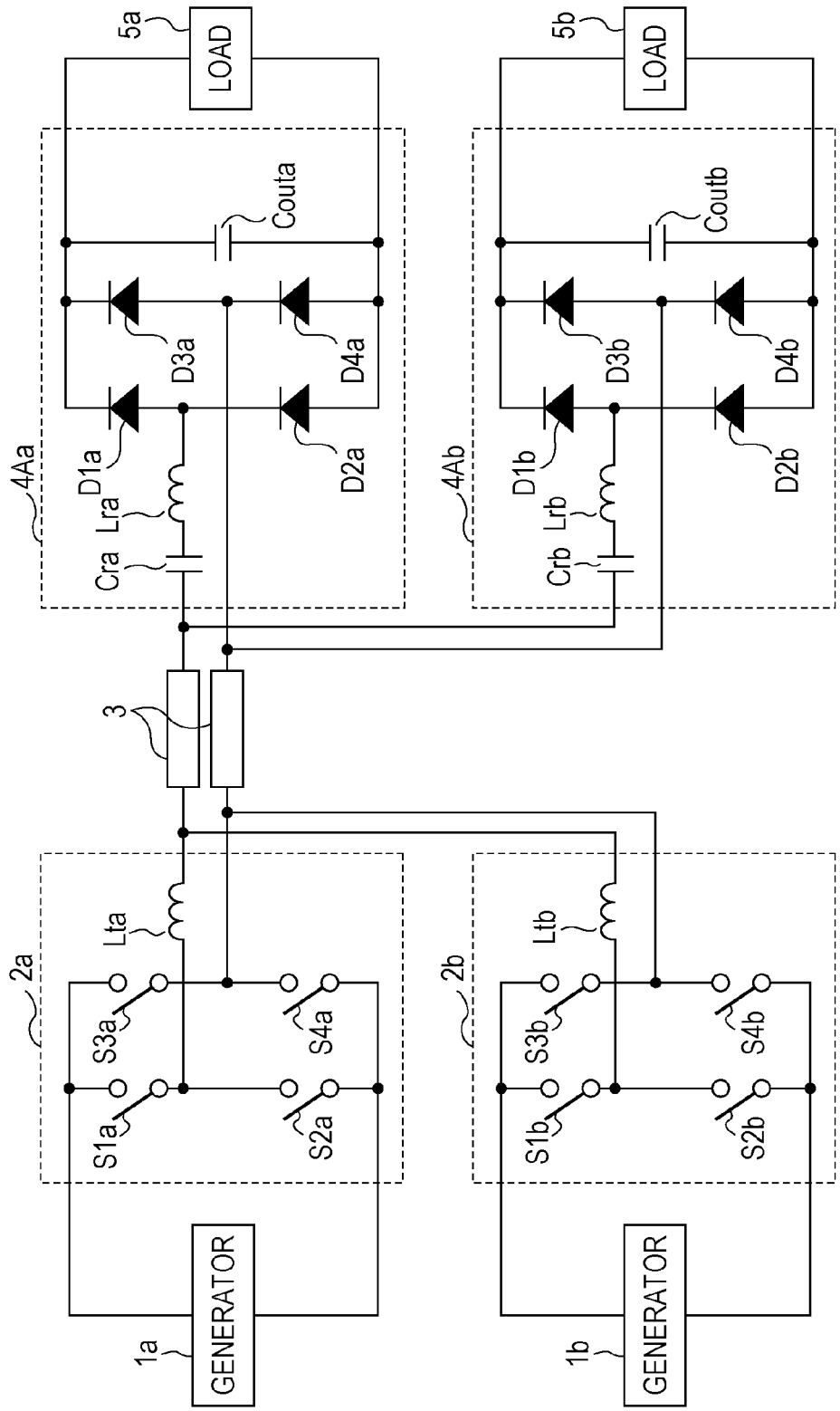
FIG. 11 is a circuit diagram showing another example structure of the electric power transmission system according to the second embodiment.

FIG. 11 is a circuit diagram showing a second example structure of the electric power transmission system 100A. For simplicity of illustration, FIG. 11 omits to show the electric power measuring instruments 1ma, 1mb, 5ma, and 5mb and the controller 10A.

Each of the demodulators 4Aa and 4Ab is identical in configuration to the demodulator 4A shown in FIG. 6. Constituent elements of the demodulator 4Aa and constituent elements of the demodulator 4Ab are distinguished by adding "a" or "b" to the end of each of the reference numerals.

In a case where the demodulators 4Aa and 4Ab output DC powers, the demodulators 4Aa and 4Ab may include bridge circuits of diodes. In this case, the configuration and operation of the electric power transmission system 100A can be simplified.

[5. Supplement]

Although the foregoing description has taken as an example an electric power transmission system including two generators and two loads, the number of generators and the number of loads are not limited to these numbers. An electric power transmission system according to the second embodiment may include three or more generators and three or more loads. The electric power transmission system for example includes a number of modulators that corresponds to the number of generators and a number of demodulators that corresponds to the number of loads.

For each pair of a modulator and a demodulator, a common frequency is set as a modulation frequency and a demodulation frequency for the modulator and the demodulator, respectively. Different frequencies are set for different pairs of a modulator and a demodulator. Alternatively, in a case where a plurality of demodulators use the same demodulation frequency, electric power can be transmitted from one modulator to the plurality of demodulators.

Third Embodiment

[1. Electric Power Transmission System]

An electric power transmission system according to a third embodiment is identical in configuration to the electric power transmission system 100 shown in FIG. 1.

The electric power transmission system according to the third embodiment includes a modulator 2B, a demodulator 4B, and a controller 10B instead of the modulator 2, the demodulator 4, and the controller 10.

[2. Configurations of Modulator and Demodulator]

Figure 12:
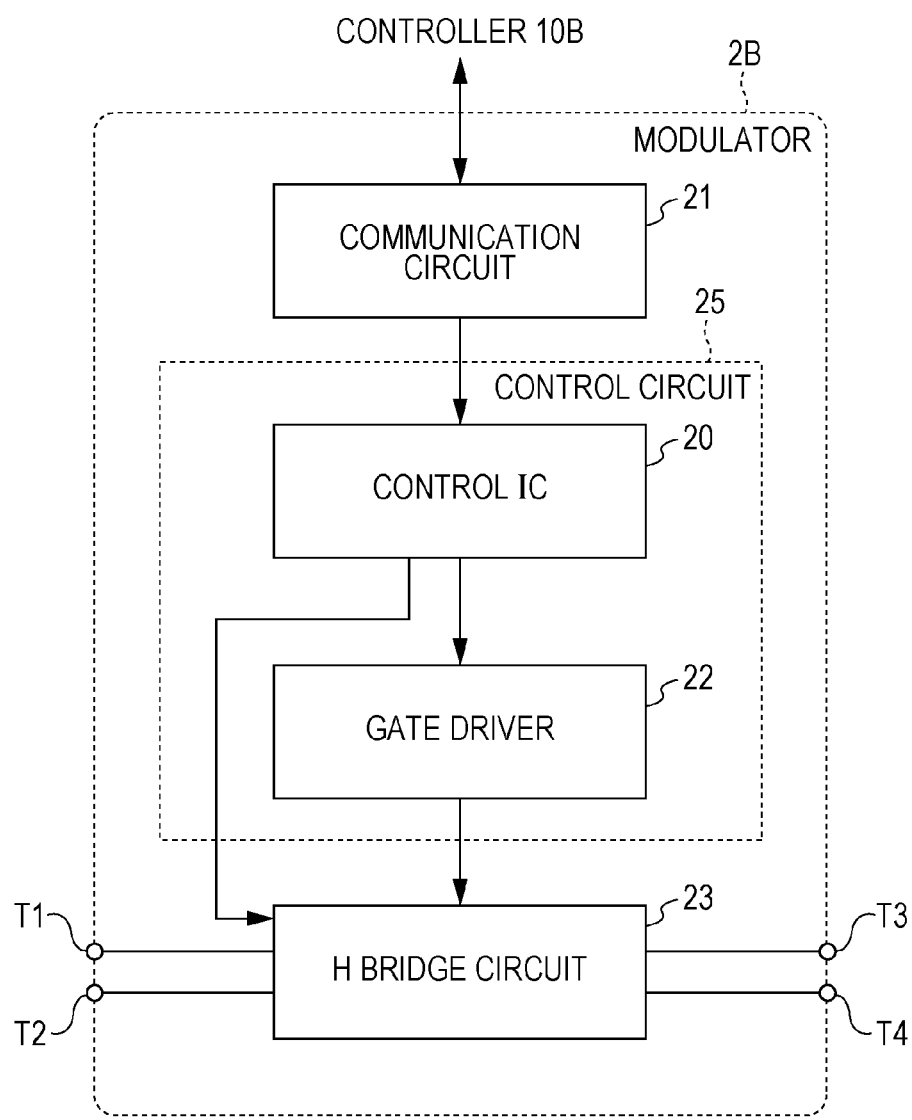
FIG. 12 is a block diagram showing an example configuration of a modulator according to a third embodiment.

FIG. 12 shows a configuration of the modulator 2B.

The modulator 2B includes a control circuit 25, a communication circuit 21, and an H bridge circuit 23. The control circuit 25 for example includes a control IC 20 and a gate driver 22.

The communication circuit 21 receives a control signal from the controller 10B and sends it to the control circuit 25. The communication circuit 21 for example includes an antenna, a tuned circuit, and a detector.

The control signal for example contains a synchronizing signal and information on a modulation frequency. The synchronizing signal may be a trigger signal that causes modulation to start or may be a trigger signal that causes modulation to end. Alternatively, the synchronizing signal may be time information that represents a point in time when modulation should start or may be time information that represents a point in time when modulation should end.

The control IC 20 generates a predetermined modulating signal in accordance with the control signal and causes the gate driver 22 to generates a plurality of gate signals corresponding to this modulating signal. The control IC 20 includes a processor and is for example a microcomputer.

The gate driver 22 outputs the gate signals to the H bridge circuit 23, thereby controlling the H bridge circuit 23.

The modulator 2B includes input terminals T1 and T2 connected to the generator 1 and output terminals T3 and T4 connected to the transmission line 3. The input terminals T1 and T2 function as an input port, and the output terminals T3 and T4 function as an output port.

Figure 13:
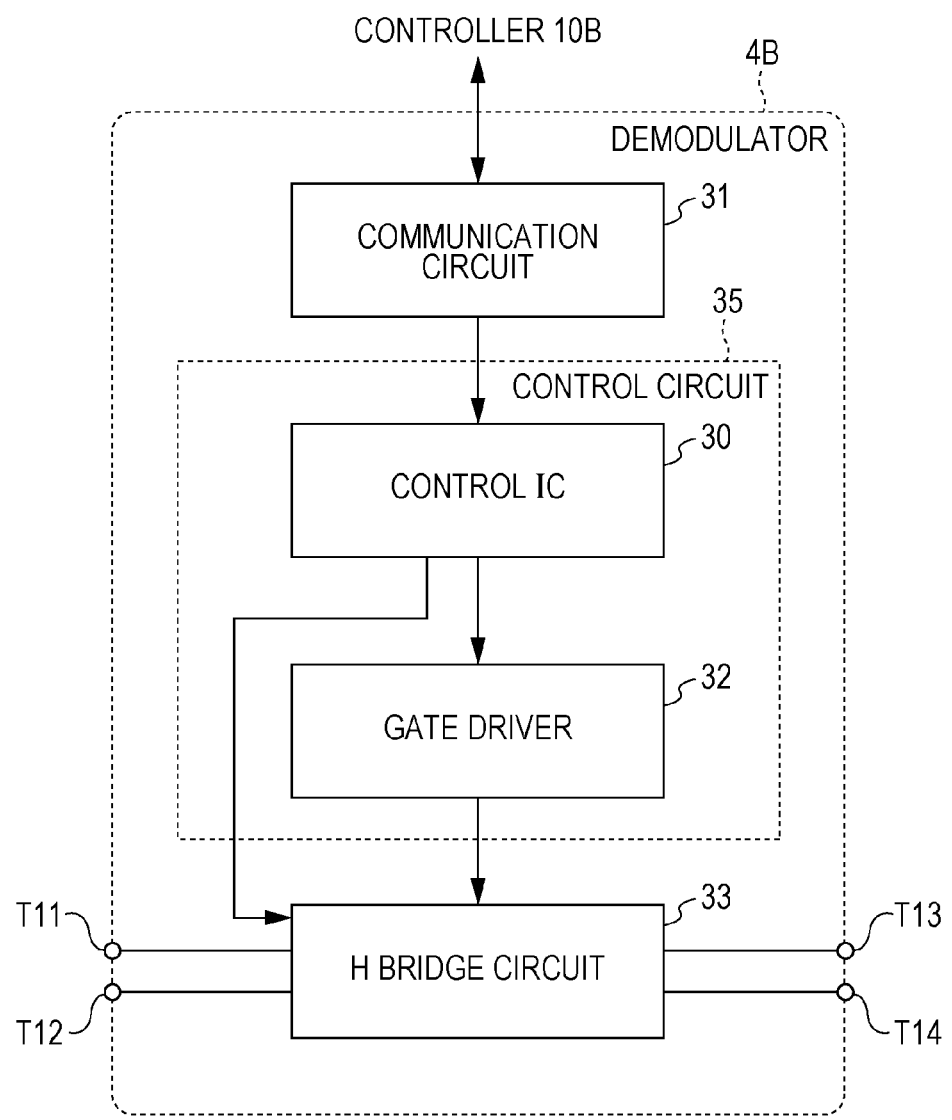
FIG. 13 is a block diagram showing an example configuration of a demodulator according to the third embodiment.

FIG. 13 shows a configuration of the demodulator 4B.

The demodulator 4B includes a control circuit 35, a communication circuit 31, and an H bridge circuit 33. The control circuit 35 for example includes a control IC 30 and a gate driver 32.

The communication circuit 31 receives a control signal from the controller 10B and sends it to the control circuit 35. The communication circuit 31 for example includes an antenna, a tuned circuit, and a detector.

The control signal for example contains a synchronizing signal and information on a demodulation frequency. The synchronizing signal may be a trigger signal that causes demodulation to start or may be a trigger signal that causes demodulation to end. Alternatively, the synchronizing signal may be time information that represents a point in time when demodulation should start or may be time information that represents a point in time when demodulation should end.

The control IC 30 generates a predetermined demodulating signal in accordance with the control signal and causes the gate driver 32 to generates a plurality of gate signals corresponding to this modulating signal. The control IC 30 includes a processor and is for example a microcomputer.

The gate driver 32 outputs the gate signals to the H bridge circuit 33, thereby controlling the H bridge circuit 33.

The modulator 4B includes input terminals T11 and T12 connected to the transmission line 3 and output terminals T13 and T14 connected to the load 5. The input terminals T11 and T12 functions as an input port, and the output terminals T13 and T14 function as an output port.

The control signals from the controller 10B to the modulator 2B and the demodulator 4B may be sent though a path that is different from the transmission line 3 or may be multiplexed with an electric power transmission and sent through the transmission line 3. In the latter case, communication paths (e.g. cables) from the controller 10B to the modulator 2B and the demodulator 4B are eliminated, so that a cost reduction can be achieved.

[3. Circuit Structure and Operation]

[3-1. First Example Structure]

Figure 14:
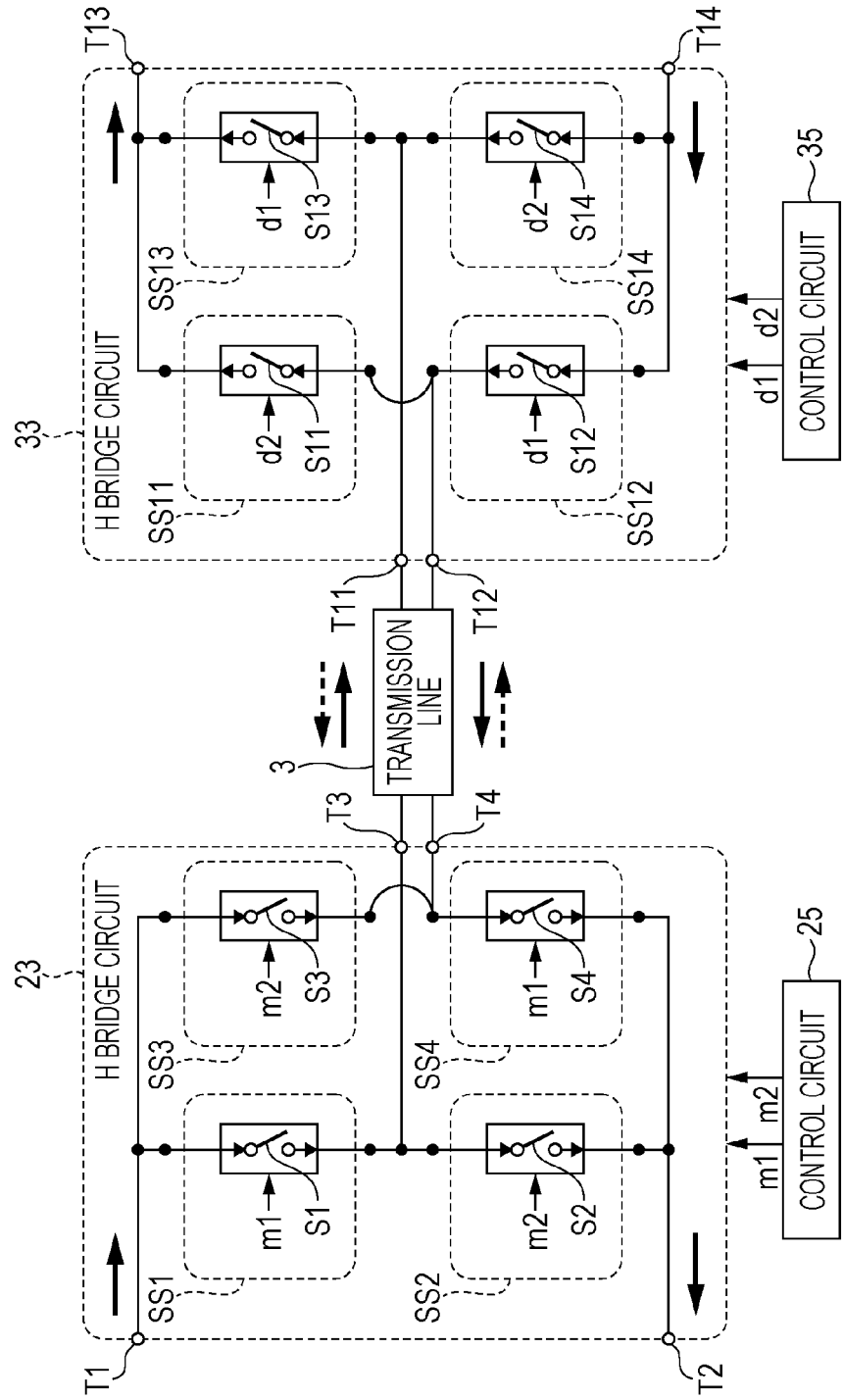
FIG. 14 is a first example structure of an electric power transmission system according to the third embodiment.

FIG. 14 is a first example structure of the electric power transmission system according to the third embodiment. For simplicity of illustration, FIG. 14 omits to show the generator 1, the load 5, the communication circuits 21 and 31, and the controller 10B.

In FIG. 14, the H bridge circuit 23 includes four switch circuits SS1 to SS4 connected in a bridge configuration. The switch circuits SS1 to SS4 function, for example, as unidirectional switches. For example, the switch circuits SS1 to SS4 include switches S1 to S4, respectively. The switches S1 to S4 are for example MOS transistors.

In FIG. 14, the H bridge circuit 33 includes four switch circuits SS11 to SS14 connected in a bridge configuration. The switch circuits SS11 to SS14 function, for example, as unidirectional switches. For example, the switch circuits SS11 to SS14 include switches S11 to S14, respectively. The switches S11 to S14 are for example MOS transistors.

The control circuit 25 generates predetermined modulating signals m1 and m2. The control circuit 25 applies the modulating signal m1 to the switches S1 and S4 as a control signal and applies the modulating signal m2 to the switches S2 and S3 as a control signal.

For example, the switches S1 to S4 are in on-state while a modulating signal indicates "1", and the switches S1 to S4 are in off-state while a modulating signal indicates "0". It should be noted that switches other than the switches S1 to S4 hereinafter operate in a similar way. Note here that each of the switches S1 to S4 has directivity to the following effect.

When the switch S1 is in on-state, an electric current flows from the terminal T1 to the terminal T3. When the switch S3 is in on-state, an electric current flows from the terminal T1 to the terminal T4. When the switch S2 is in on-state, an electric current flows from the terminal T3 to the terminal T2. When the switch S4 is in on-state, an electric current flows from the terminal T4 to the terminal T2.

The control circuit 35 generates predetermined demodulating signals d1 and d2. The control circuit 35 applies the demodulating signal d1 to the switches S12 and S13 as a control signal and applies the demodulating signal d2 to the switches S11 and S14 as a control signal.

When the switch S11 is in on-state, an electric current flows from the terminal T12 to the terminal T13. When the switch S13 is in on-state, an electric current flows from the terminal T11 to the terminal T13. When the switch S12 is in on-state, an electric current flows from the terminal T14 to the terminal T12. When the switch S14 is in on-state, an electric current flows from the terminal T14 to the terminal T11.

It should be noted that, in FIG. 14, the directions of flow of electric currents through the switches S11 to S14 of the H bridge circuit 33 is opposite to the directions of flow of electric currents through the switches S1 to S4 of the H bridge circuit 23. In FIG. 14, electric currents that flow in the directions of solid arrows are deemed as positive currents.

[3-2. First Example of Operation]

An operation in which DC power is inputted to the modulator 2B and DC power is outputted from the demodulator 4B is described as a first example of operation with reference to the electric power transmission system shown in FIG. 14.

Figure 15:
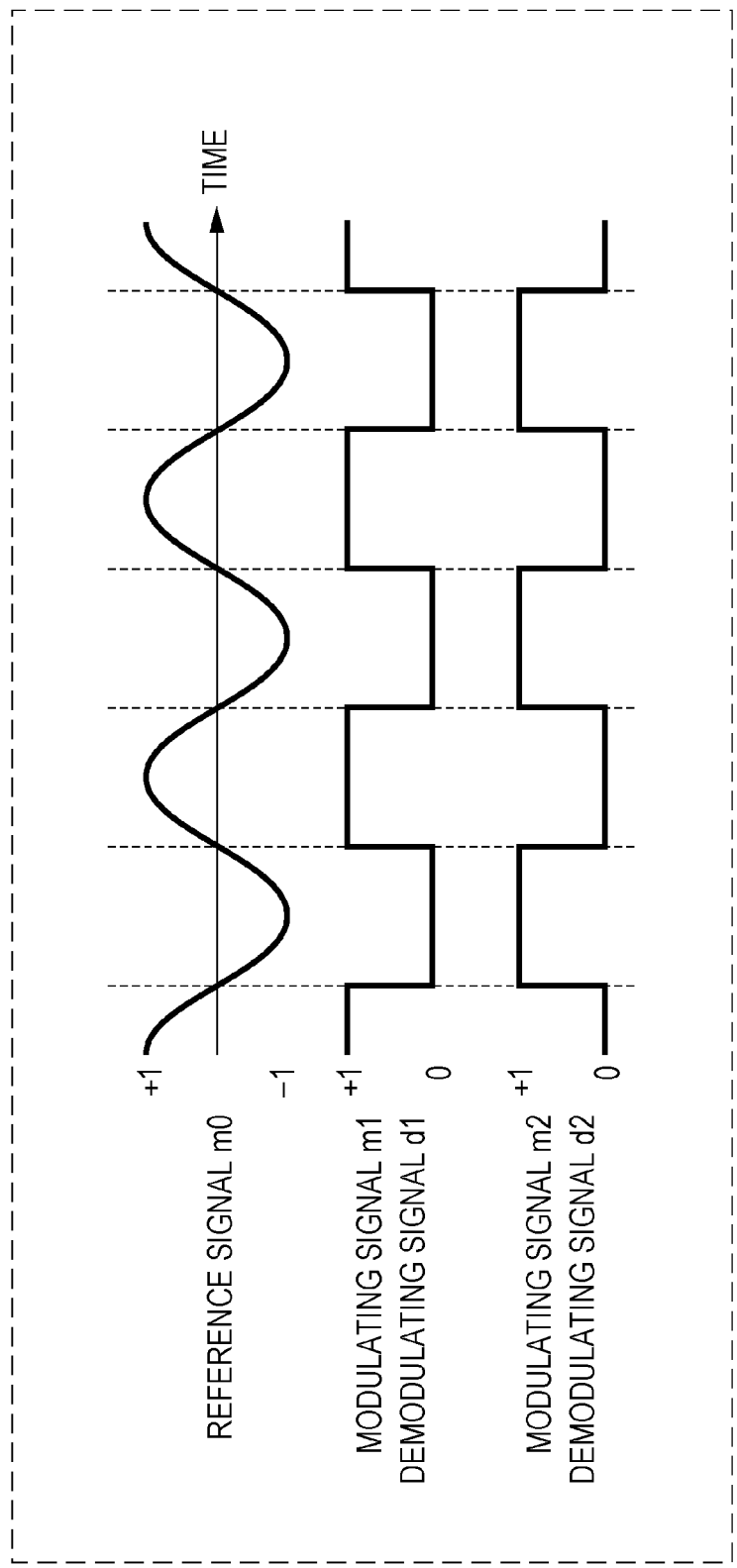
FIG. 15 is a waveform chart showing the waveforms of a reference signal, modulating signals, and demodulating signals according to a first example of operation of the third embodiment.

FIG. 15 is a diagram explaining how the modulating signals m1 and m2 and the demodulating signals d1 and d2 are generated.

The controller 10B for example causes the modulator 2B and the demodulator 4B to set a common reference signal m0 in advance. That is, the reference signal m0 of the modulator 2B and the reference signal m0 of the demodulator 4B have a common frequency and a common phase. The control circuit 25 generates the reference signal m0 and generates the modulating signals m1 and m2 from the reference signal m0. The control circuit 35 generates the reference signal m0 and generates the demodulating signals d1 and d2 from the reference signal m0.

The modulating signal m1 and the demodulating signal d1 indicate "1" in a period during which the reference signal m0 is positive and indicate "0" in a period during which the reference signal m0 is negative. The modulating signal m2 and the demodulating signal d2 indicate "0" in a period during which the reference signal m0 is positive and indicate "1" in a period during which the reference signal m0 is negative.

When the switches S1 and S4 are in on-state and the switches S2 and S3 are in off-state, the positive power current inputted to the H bridge circuit 23 flows in the directions of the solid arrows of FIG. 14, and thereby a positive transmission current flows to the terminals T3 and T4.

When the switches S1 and S4 are in off-state and the switches S2 and S3 are in on-state, the positive power current inputted to the H bridge circuit 23 flows in the directions of the solid arrows of FIG. 14, and thereby a negative transmission current flows to the terminals T3 and T4.

Therefore, the H bridge circuit 23 modulates the inputted DC source power into AC power and outputs the modulated electric power to the transmission line 3 as transmission power.

The demodulating signals d1 and d2 are in synchronization with the modulating signals m1 and m2. That is, when a positive transmission current flows through the transmission line 3, the demodulating signal d1 indicates "1" and the demodulating signal d2 indicates "0". At this time, the switches S12 and S12 are in on-state, and the switches S11 and S14 are in off-state. Therefore, the positive transmission current inputted to the H bridge circuit 33 flows in the directions of the solid arrows of FIG. 14, and thereby a positive load current flows to the terminals T13 and T14.

Meanwhile, when a negative transmission current flows through the transmission line 3, the demodulating signal d1 indicates "0" and the demodulating signal d2 indicates "1". At this time, the switches S11 and S14 are in on-state, and the switches S12 and S13 are in off-state. Therefore, the negative transmission current inputted to the H bridge circuit 33 flows in the directions of the solid arrows of FIG. 14, and thereby a positive load current flows to the terminals T13 and T14.

Therefore, the H bridge circuit 33 modulates the inputted AC transmission power into positive DC power and outputs the modulated DC power to the load 5 as load power.

According to the first example of operation, the modulator 2B modulates a DC power current into an AC transmission current and outputs it to the transmission line 3, and the demodulator 4B acquires the transmission current from the transmission line 3 and demodulates the transmission current into a DC load current. This makes it possible to transmit DC power from the generator 1 to the load 5.

It should be noted that the sum of periods of time during which a modulating signal indicates "1" and the sum of periods of time during which the modulating signal indicates "0" are the same, an electric current modulated by this modulating signal averagely does not have a DC component but has only an AC component. Therefore, the transmission current that flows through the transmission line 3 is an AC current. This makes it possible to prevent an unwanted rise in voltage due to a DC component even in a case of having the inductances of the transmission line 3 and the load 5.

Although the first example of operation has been described a case where an electric power is transmitted between a pair of a modulator and a demodulator, the first example of operation is applicable to a case where electric powers are transmitted between plural pairs of a modulator and a demodulator, respectively. In this case, for example, the frequency of the reference signal m0 is set to be different for each separate pair. This makes it possible to identify a pair of a modulator and a demodulator according to frequencies and separate transmitted electric powers for each separate pair. The frequency of a reference signal of one pair may be set to be an integral multiple of the frequency of a reference signal of another pair. This causes the electric power transmitted from the modulator of another pair to be 0 when integrated by the period of the lowest frequency in the demodulator of each pair. Therefore, the electric power can be transmitted without influence on electric power that is demodulated in a demodulator to which it is not addressed.

[3-3. Second Example Structure]

A second example structure of the electric power transmission system according to the third embodiment is described with reference to FIGS. 16 and 17.

Figure 16:
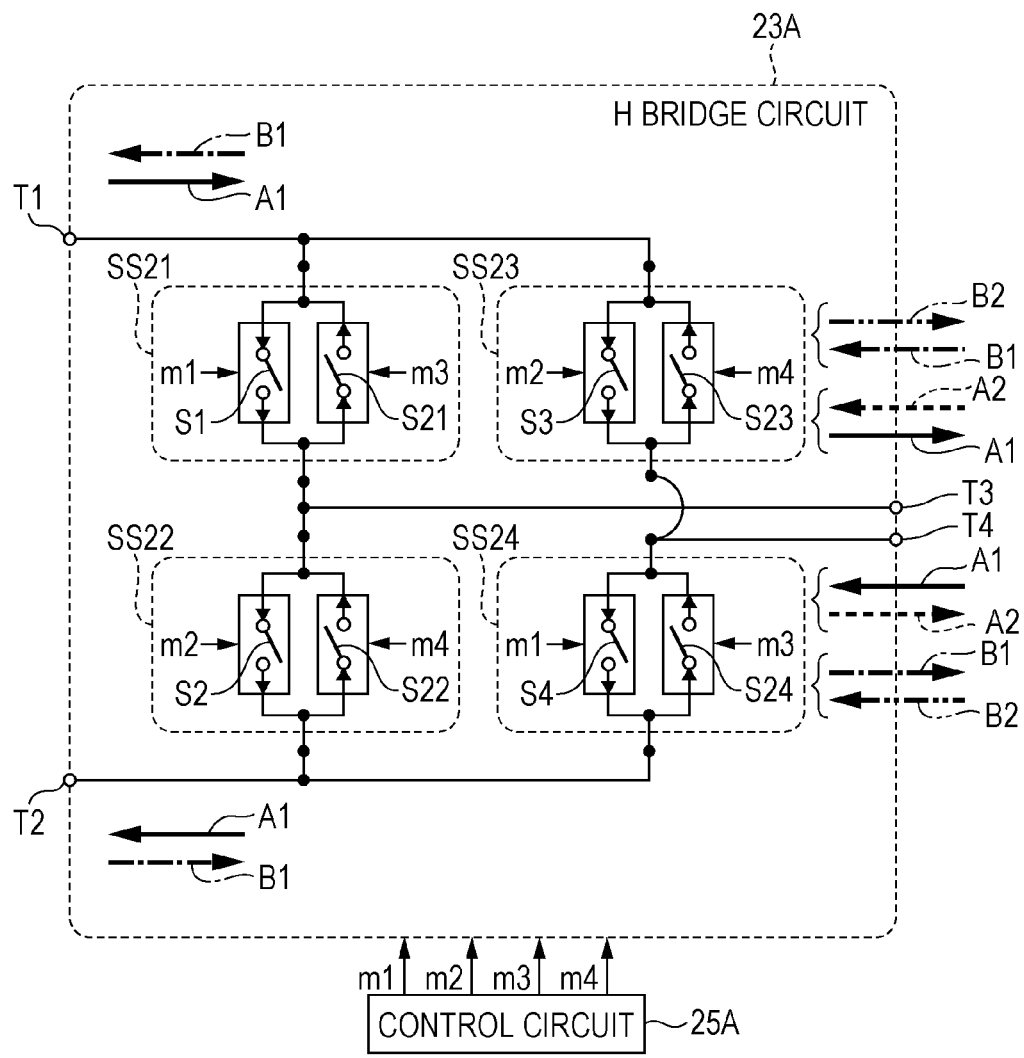
FIG. 16 is a second example structure of a modulator according to the third embodiment.

FIG. 16 shows an H bridge circuit 23A and a control circuit 25A according to the second example structure. The circuits shown in FIG. 16 are different from the circuits shown in FIG. 14 in terms of the following points.

(1) Bidirectional switch circuits SS21 to SS24 shown in FIG. 16 are provided instead of the switch circuits SS1 to SS4 shown in FIG. 14.
(2) The control circuit 25A is provided instead of the control circuit 25 shown in FIG. 14. The control circuit 25A generates four modulating signals m1 to m4 and outputs them to the H bridge circuit 23A.

In addition to the switch S1 of FIG. 14, the switch circuit SS21 includes a switch S21 connected in a direction opposite to and in parallel to the switch S1. The switch S21 is turned on and off in response to the modulating signal m3. In addition to the switch S2 of FIG. 14, the switch circuit SS22 includes a switch S22 connected in a direction opposite to and in parallel to the switch S2. The switch S22 is turned on and off in response to the modulating signal m4. In addition to the switch S3 of FIG. 14, the switch circuit SS23 includes a switch S23 connected in a direction opposite to and in parallel to the switch S3. The switch S23 is turned on and off in response to the modulating signal m4. In addition to the switch S4 of FIG. 14, the switch circuit SS24 includes a switch S24 connected in a direction opposite to and in parallel to the switch S4. The switch S24 is turned on and off in response to the modulating signal m3.

The switches S21 to S24 are for example MOS transistors.

The H bridge circuit 23A includes terminals T1 and T2 connected to the generator 1 and terminals T3 and T4 connected to the transmission line 3. The H bridge circuit 23A receives baseband AC power from the generator 1. The H bridge circuit 23A modulates the AC power and then outputs the modulated electric power to the transmission line 3.

In FIG. 16, electric currents that flow in the directions of arrows A1 and B2 are deemed as positive currents, and electric currents that flow in the directions of arrows A2 and B1 are deemed as negative currents. That is, FIG. 16 assumes that the direction of an electric current at the time when the terminal T1 is higher in potential than the terminal T2 is positive and the opposite direction is negative.

Figure 17:
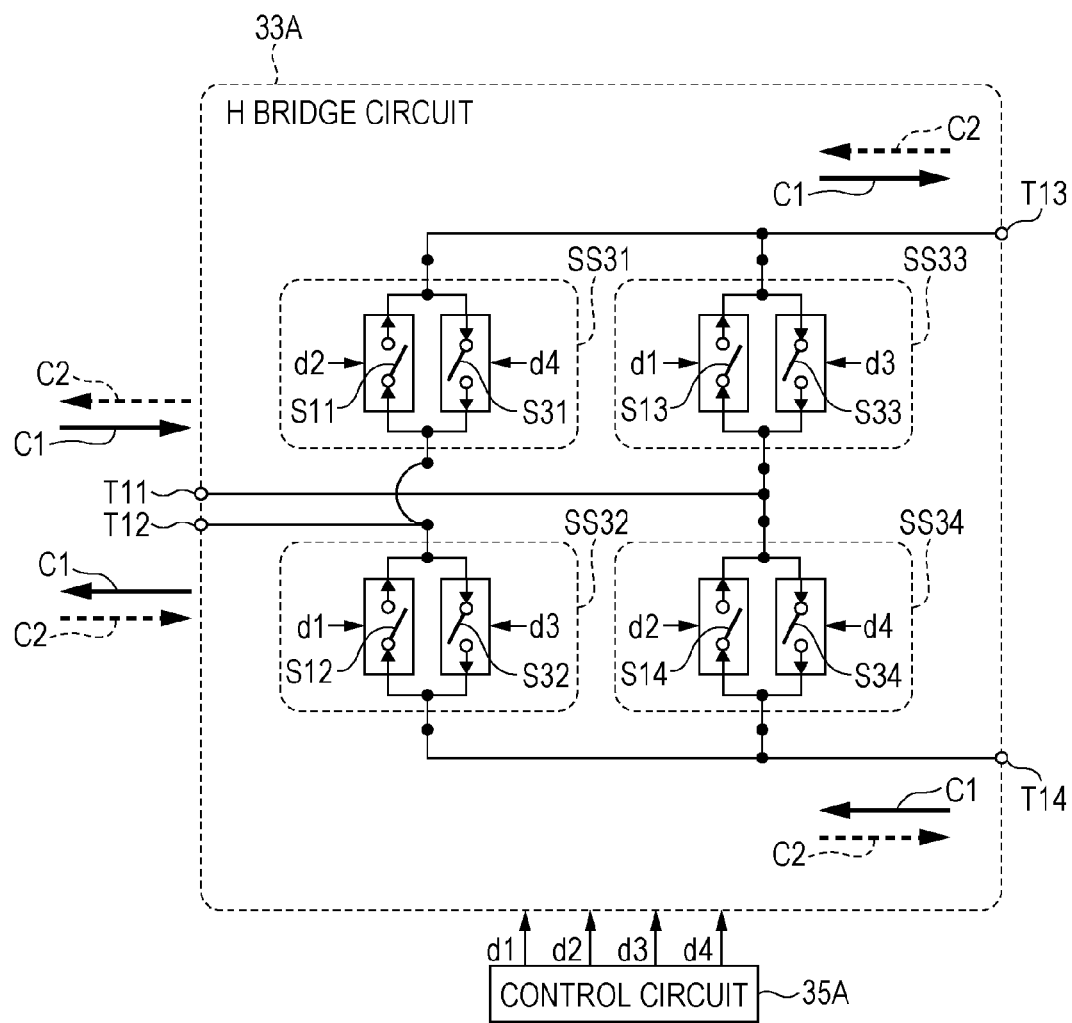
FIG. 17 is a circuit diagram showing a second example structure of a demodulator according to the third embodiment.

FIG. 17 shows an H bridge circuit 33A and a control circuit 35A according to the second example structure. The circuits shown in FIG. 17 are different from the circuits shown in FIG. 14 in terms of the following points.
(1) Bidirectional switch circuits SS31 to SS34 shown in FIG. 17 are provided instead of the switch circuits SS1 to SS4 shown in FIG. 14.
(2) The control circuit 35A is provided instead of the control circuit 35 shown in FIG. 14. The control circuit 35A generates four demodulating signals d1 to d4 and outputs them to the H bridge circuit 33A.

In addition to the switch S11 of FIG. 17, the switch circuit SS31 includes a switch S31 connected in a direction opposite to and in parallel to the switch S11. The switch S31 is turned on and off in response to the demodulating signal d4. In addition to the switch S12 of FIG. 14, the switch circuit SS32 includes a switch S32 connected in a direction opposite to and in parallel to the switch S12. The switch S32 is turned on and off in response to the demodulating signal d3. In addition to the switch S13 of FIG. 14, the switch circuit SS33 includes a switch S33 connected in a direction opposite to and in parallel to the switch S13. The switch S33 is turned on and off in response to the demodulating signal d3. In addition to the switch S14 of FIG. 17, the switch circuit SS34 includes a switch S34 connected in a direction opposite to and in parallel to the switch S14. The switch S34 is turned on and off in response to the demodulating signal d4.

The switches S31 to S34 are for example MOS transistors.

The H bridge circuit 33A includes terminals T11 and T12 connected to the transmission line 3 and terminals T13 and T14 connected to the load 5. The H bridge circuit 33A receives AC power from the transmission line 3. The H bridge circuit 33A demodulates modulated electric power into baseband AC power and then outputs the baseband AC power to the load 5.

In FIG. 17, electric currents that flow in the directions of arrows C1 are deemed as positive currents, and electric currents that flow in the directions of arrows C2 are deemed as negative currents. That is, FIG. 17 assumes that the direction of an electric current at the time when the terminal T13 is higher in potential than the terminal T14 is positive and the opposite direction is negative.

[3-4. Second Example of Operation]

An operation in which AC power is inputted to the modulator 2B and AC power is outputted from the demodulator 4B is described as a second example of operation with reference to the electric power transmission system including the demodulator 2B shown in FIG. 16 and the demodulator 4B shown in FIG. 17.

Figure 18:
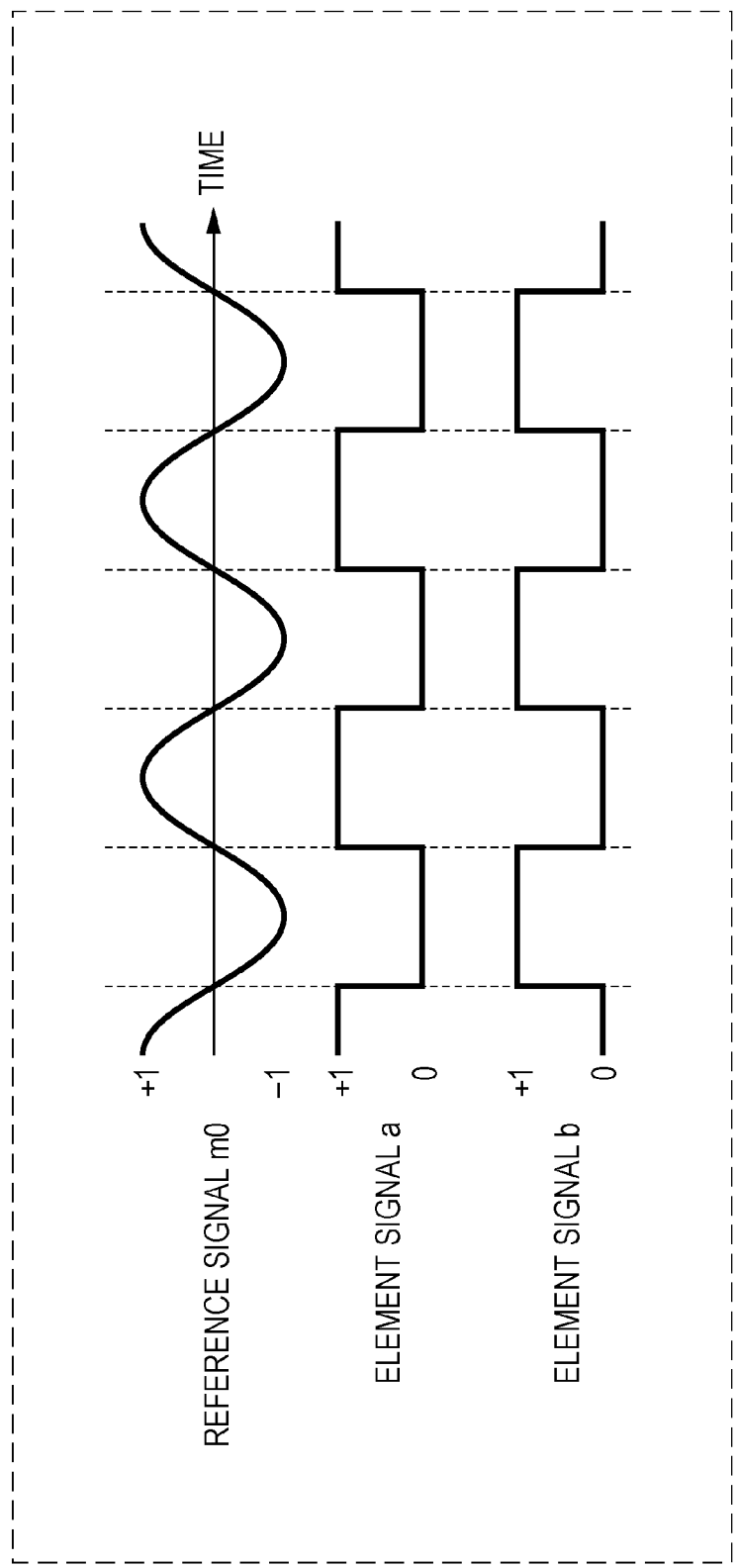
FIG. 18 is a waveform chart showing the waveforms of a reference signal, a modulating signal, and a demodulating signal according to a second example of operation of the third embodiment.

FIG. 18 shows a relationship between a reference signal and element signals a and b. Table 1 shows demodulating signals m1 to m4 and demodulating signals d1 to d4 in the present example of operation.

TABLE 1

| | POWER CURRENT | LOAD CURRENT | m1, m2 | m3, m4 | d1, d2 | d3, d4 |
|---|---|---|---|---|---|---|
| i | + | + | (a, b) | (0, 0) | (a, b) | (0, 0) |
| ii | + | − | (0, 0) | (a, b) | (0, 0) | (a, b) |
| iii | − | + | (b, a) | (0, 0) | (b, a) | (0, 0) |
| iv | − | − | (0, 0) | (b, a) | (0, 0) | (b, a) |

The control circuit 25A generates, from the reference signal m0, element signals a and b such as those shown in FIG. 18. Similarly, the control circuit 35A generates the element signals a and b from the reference signal m0. The element signal a indicates "1" in a period during which the reference signal m0 is positive and indicates "0" in a period during which the reference signal m0 is negative. The element signal b indicates "0" in a period during which the reference signal m0 is positive and indicates "1" in a period during which the reference signal m0 is negative.

The control circuit 25A selects one signal from among the element signals a and b and a zero signal, and generates the modulating signals m1 to m4 by appropriately changing from selecting one signal to selecting another signal. The control circuit 35A selects one signal from among the element signals a and b and a zero signal, and generates the demodulating signals d1 to d4 by appropriately changing from selecting one signal to selecting another signal.

According to Table 1, the modulating signals m1 to m4 and the demodulating signals d1 to d4 are generated in the following manner. Each switch is controlled so that if the direction of a power current and the direction of a load current are the same, the direction of an electric current flowing through the H bridge circuit 23A and the direction of an electric current flowing through the H bridge circuit 33A are the same. On the other hand, each switch is controlled so that if the direction of a power current and the direction of a load current are opposite to each other, the direction of an electric current flowing through the H bridge circuit 23A and the direction of an electric current flowing through the H bridge circuit 33A are opposite to each other. This makes it possible, for example, to perform modulation and demodulation regardless of the directivity of the power current and the load current in a case where AC power is inputted to the modulator 2B and AC power is outputted from the demodulator 4B.

The present example of operation described below assumes a case where the power current and the load current are alternating currents of the same waveform. In this example of operation, the patterns (i) and (iv) in Table 1 are selectively adopted.

The following describes how the H bridge circuit 23A of the modulator 2B operate.

First, a case is described where a positive power current flows to the terminals T1 and T2. In this case, as indicated by the pattern (i) of Table 1, the switches S21 to S24 are maintained in off-state by the demodulating signals m3 and m4, which are zero signals. Meanwhile, the switches S1 and S4 and the switchers S2 and S3 are complementarily turned on and off in accordance with the modulating signals m1 and m2. When the switches S1 and S4 are in on-state and the switches S2 and S3 are in off-state, the power current flows in the directions of the arrows A1 of FIG. 16, so that a positive transmission current is outputted from the terminals T3 and T4. On the other hand, when the switches S1 and S4 are in off-state and the switches S2 and S3 are in on-state, the power current flows in the directions of the arrows A2 of FIG. 16, so that a negative transmission current is outputted from the terminals T3 and T4.

Next, a case is described where a negative power current flows to the terminals T1 and T2. In this case, as indicated by the pattern (iv) of Table 1, the switches S1 to S4 are maintained in off-state by the modulating signals m1 and m2, which are zero signals. Meanwhile, the switches S21 and S24 and the switchers S22 and S23 are complementarily turned on and off in accordance with the modulating signals m3 and m4. When the switches S21 and S24 are in on-state and the switches S22 and S23 are in off-state, the power current flows in the directions of the arrows B1 of FIG. 16, so that a negative transmission current is outputted from the terminals T3 and T4. On the other hand, when the switches S21 and S24 are in off-state and the switches S22 and S23 are in on-state, the power current flows in the directions of the arrows B2 of FIG. 16, so that a positive transmission current is outputted from the terminals T3 and T4.

This allows the modulator 2B to modulate the inputted AC power current and output the modulated electric current to the transmission line 3 as an AC transmission current.

It should be noted that the modulator 2B can output an AC transmission current even in a case where a positive DC current has been inputted and can output an AC transmission current even in a case where a negative DC current has been inputted.

The following describes how the H bridge circuit 33A of the demodulator 4B operate.

First, a case is described where a positive power current is inputted to the terminals T1 and T2 and a positive transmission current is inputted to the terminals T11 and T12. In this case, as indicated by the pattern (i) of Table 1, the switches S31 to S34 are maintained in off-state by the demodulating signals d3 and d4, which are zero signals. Meanwhile, the switches S11 and S14 are brought into on-state in response to the inputting of "1" of the demodulation signal d1, and the switches S12 and S13 are brought into off-state in response to the inputting of "0" of the demodulation signal d2. Therefore, the transmission current flows in the directions of the arrows C1 of FIG. 17, so that a positive load current is outputted from the terminals T13 and T14.

Second, a case is described where a positive power current is inputted to the terminals T1 and T2 and a negative transmission current is inputted to the terminals T11 and T12. In this case, as indicated by the pattern (i) of Table 1, the switches S31 to S34 are maintained in off-state by the demodulating signals d3 and d4, which are zero signals. Meanwhile, the switches S12 and S13 are brought into off-state in response to the inputting of "0" of the demodulation signal d1, and the switches S11 and S14 are brought into on-state in response to the inputting of "1" of the demodulation signal d2. Therefore, the transmission current flows in the directions of the arrows C1 of FIG. 17, so that a positive load current is outputted from the terminals T13 and T14.

Third, a case is described where a negative power current is inputted to the terminals T1 and T2 and a negative transmission current is inputted to the terminals T11 and T12. In this case, as indicated by the pattern (iv) of Table 1, the switches S11 to S14 are maintained in off-state by the demodulating signals d1 and d2, which are zero signals. Meanwhile, the switches S32 and S33 are brought into on-state in response to the inputting of "1" of the demodulation signal d3, and the switches S31 and S34 are brought into off-state in response to the inputting of "0" of the demodulation signal d4. Therefore, the transmission current flows in the directions of the arrows C2 of FIG. 17, so that a negative load current is outputted from the terminals T13 and T14.

Fourth, a case is described where a negative power current is inputted to the terminals T1 and T2 and a positive transmission current is inputted to the terminals T11 and T12. In this case, as indicated by the pattern (iv) of Table 1, the switches S11 to S14 are maintained in off-state by the demodulating signals d1 and d2, which are zero signals. Meanwhile, the switches S32 and S33 are brought into on-state in response to the inputting of "1" of the demodulation signal d3, and the switches S31 and S34 are brought into off-state in response to the inputting of "0" of the demodulation signal d4. Therefore, the transmission current flows in the directions of the arrows C2 of FIG. 17, so that a negative load current is outputted from the terminals T13 and T14.

All this causes a positive load current to be outputted from the demodulator 4A in a case where a positive power current has been inputted to the modulator 2A and causes a negative load current to be outputted from the demodulator 4A in a case where a negative power current has been inputted to the modulator 2A. That is, the demodulator 4A can restore AC power equivalent to a power current through demodulation.

[4. Supplement]

The electric power transmission system according to the third embodiment makes it possible to output, to the transmission line 3, electric power inputted from the generator 1 and output, to the load 5, electric power acquired from the transmission line 3.

The controller 10B may send, to each of the modulator 2B and the demodulator 4B, information designating the frequency of the reference signal or the reference signal per se. Alternatively, the controller 10B may send the modulating signals and the demodulating signals to the modulator 2B and the demodulator 4B, respectively. In either case, the modulator 2B and the demodulator 4B can be synchronized with each other to achieve accurate modulation and demodulation of electric power.

The electric power transmission system including the modulator 2B shown in FIG. 16 and the demodulator 4B shown in FIG. 17 can for example output DC power from the demodulator 4B when DC power has been inputted to the modulator 2B. In this case, the modulating signals m3 and m4 and the demodulating signals d3 and d4 are always set to "0", and thereby the switches S21 to S24 and S31 to S34 are maintained in off-state. For this reason, the H bridge circuit 23A of FIG. 16 and the H bridge circuit 33A of FIG. 17 are substantially the same as the H bridge circuits 23 and 33 of FIG. 14. This enables the operation described in the first example of operation, for example. That is, the electric power transmission system including the modulator 2B shown in FIG. 16 and the demodulator 4B shown in FIG. 17 can perform both DC power transmission and AC power transmission by changing the modulating signals and the demodulating signals.

[5. Modification]

Figure 19:
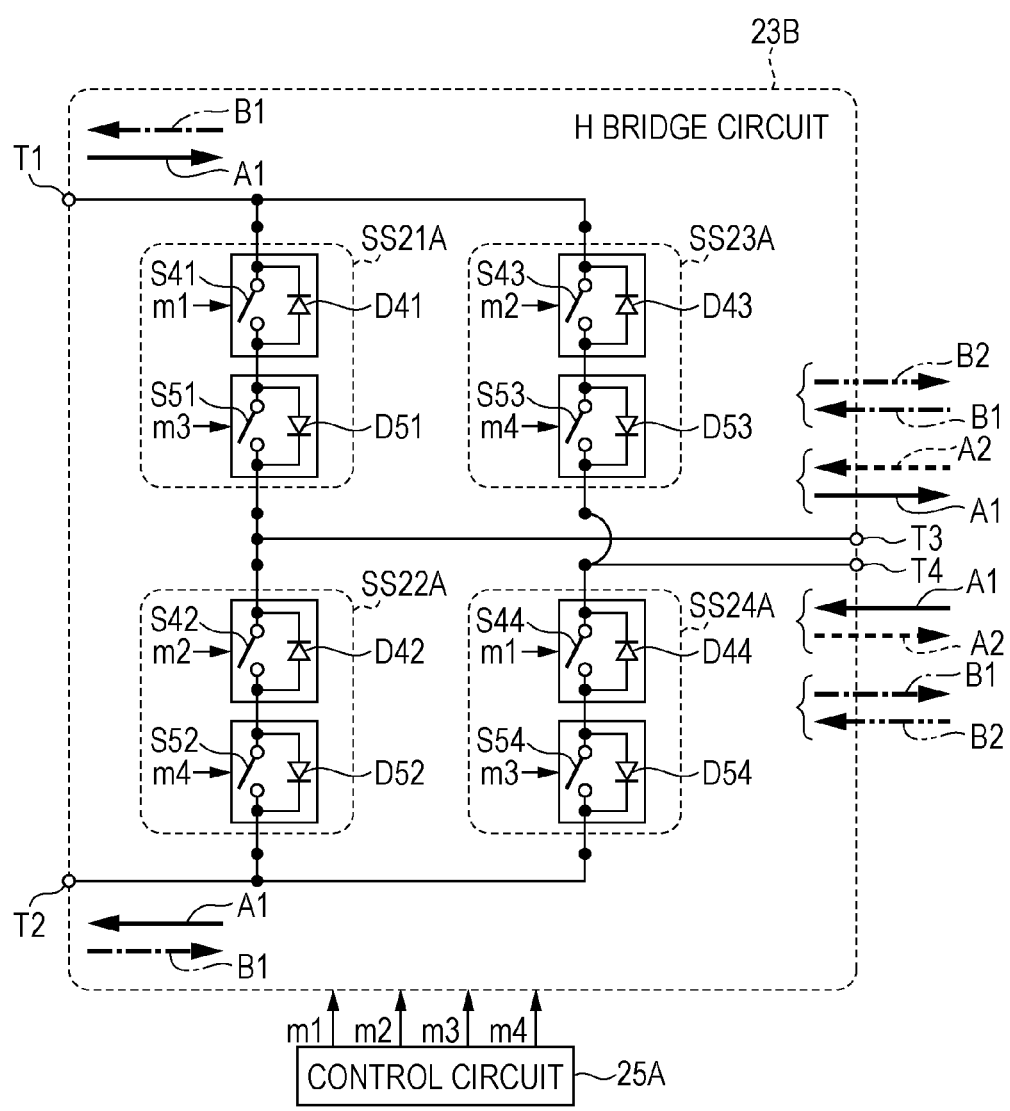
FIG. 19 is a circuit diagram showing a structure of a modulator according to a modification of the third embodiment.

FIG. 19 shows an H bridge circuit 23B according to a modification of the third embodiment. The H bridge circuit 23B shown in FIG. 19 includes bidirectional switches SS21A to SS24A instead of the bidirectional switch circuits SS21 to SS24 shown in FIG. 16.

The bidirectional switch circuit SS21A includes a switch S41, a switch S51, a diode D41, and a diode D51. The switch S41 and the switch S51 are connected in series. The diode D41 is connected in parallel to the switch S41. The diode D51 is connected in parallel to the switch S51. The diode D41 passes an electric current from the terminal T3 to the terminal T1. The diode D51 passes an electric current from the terminal T1 to the terminal T3. The bidirectional switches SS22A to SS24A are similar in structure to the bidirectional switch SS21A and, as such, are not described here.

The control circuit 25A outputs the modulating signal m1 to the switches S41 and S44, outputs the modulating signal m2 to the switches S42 and S43, outputs the modulating signal m3 to the switches S51 and S54, and outputs the modulating signal m4 to the switches S52 and S53. The modulating signals m1 to m4 may for example be those shown in Table 1.

Figure 20:
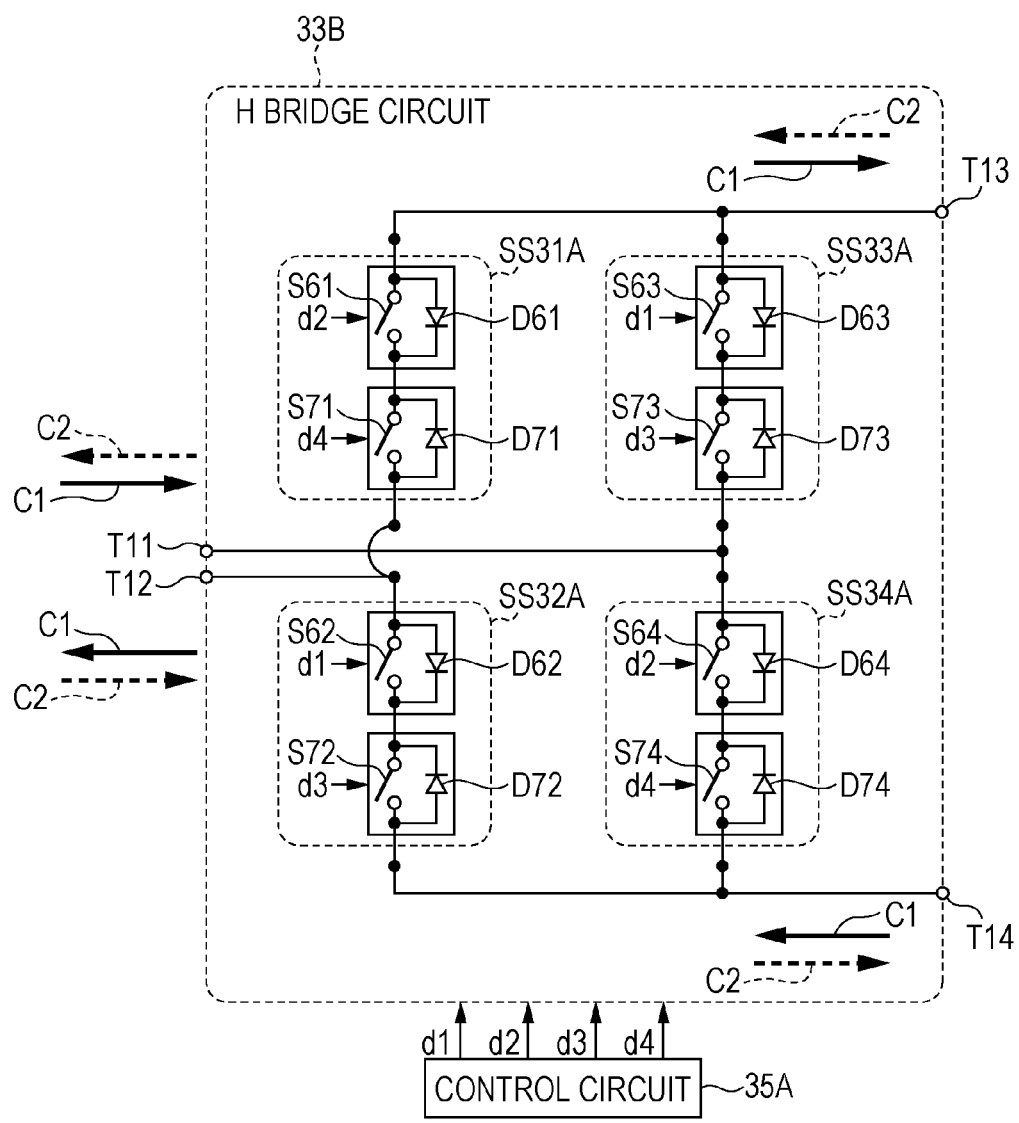
FIG. 20 is a circuit diagram showing a structure of a demodulator according to the modification of the third embodiment.

FIG. 20 shows an H bridge circuit 33B according to the modification of the third embodiment. The H bridge circuit 323B shown in FIG. 20 includes bidirectional switches SS31A to SS34A instead of the bidirectional switch circuits SS31 to SS34 shown in FIG. 17.

The bidirectional switch circuit SS31A includes a switch S61, a switch S71, a diode D61, and a diode D71. The switch S61 and the switch S71 are connected in series. The diode D61 is connected in parallel to the switch S61. The diode D71 is connected in parallel to the switch S71. The diode D61 passes an electric current from the terminal T13 to the terminal T12. The diode D71 passes an electric current from the terminal T12 to the terminal T13. The bidirectional switches SS32A to SS34A are similar in structure to the bidirectional switch SS31A and, as such, are not described here.

The control circuit 35A outputs the demodulating signal d1 to the switches S61 and S63, outputs the demodulating signal d2 to the switches S61 and S64, outputs the demodulating signal d3 to the switches S72 and S73, and outputs the demodulating signal d4 to the switches S71 and S74. The demodulating signals d1 to d4 may for example be those shown in Table 1.

The switches S41 to S44, S51 to S54, S61 to S64, and S71 to S74 may for example be MOS transistors. In that case, the diodes D41 to D44, D51 to D54, D61 to D64, and D71 to D74 may for example be body diodes of the MOS transistors. This enables reductions in size of the bidirectional switch circuits SS21A to SS24A and SS31A to SS34A.

Fourth Embodiment

Figure 21:
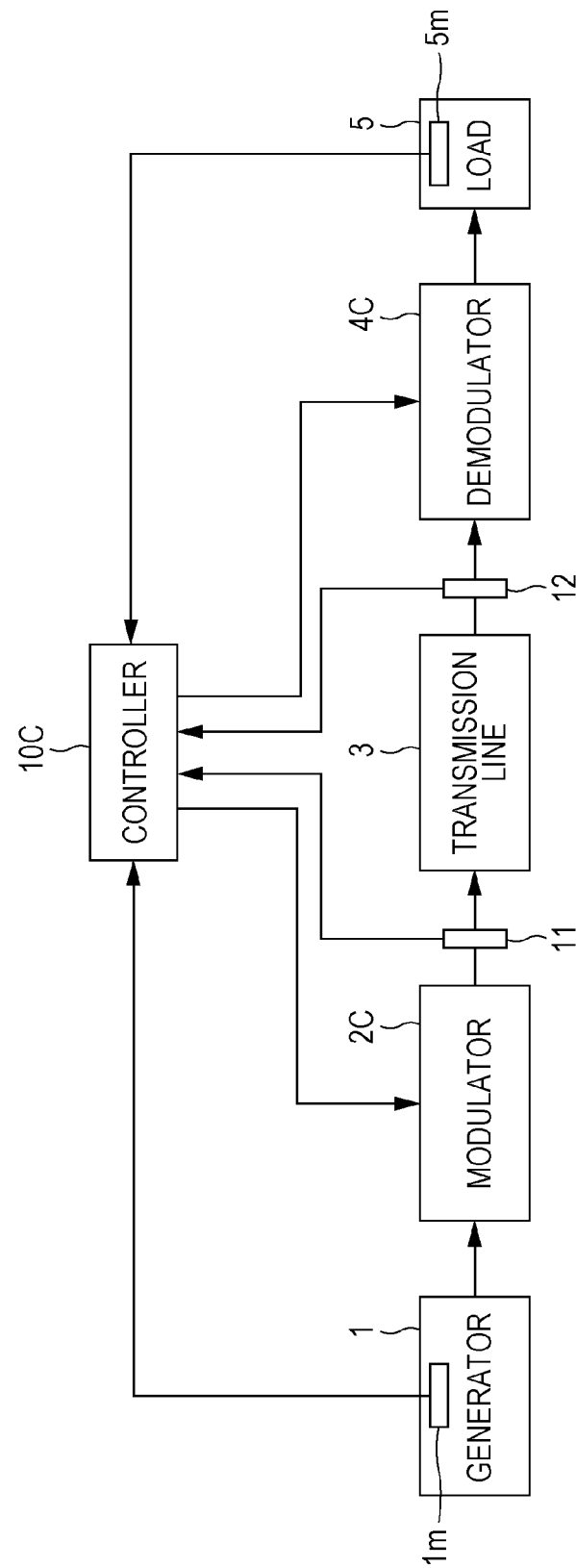
FIG. 21 is a block diagram showing an example configuration of an electric power transmission system according to a fourth embodiment.

FIG. 21 shows an example configuration of an electric power transmission system 100C according to a fourth embodiment.

The electric power transmission system 100C includes a generator 1, a modulator 2C, a transmission line 3, a demodulator 4C, a load 5, a controller 100, and power factor measuring instruments 11 and 12. The generator 1 and the load 5 include electric power measures $1m$ and $5m$, respectively. The transmission line 3 is for example a wired transmission line.

The power factor measuring instrument 11 measures the phases of current and voltage between the modulator 2C and the transmission line 3. The power factor measuring instrument 12 measures the phases of current and voltage between the transmission line 3 and the demodulator 4C. This allows the power factor measuring instruments 11 and 12 to measure the power factor of modulated electric power. The power factor measuring instruments 11 and 12 sends information on the phases of current and voltage to the controller 100.

The controller 100 generates, on the basis of the information, control signals for improving the power factor of the modulated electric power and sends them to the modulator 2C and the demodulator 4C.

Figure 22:
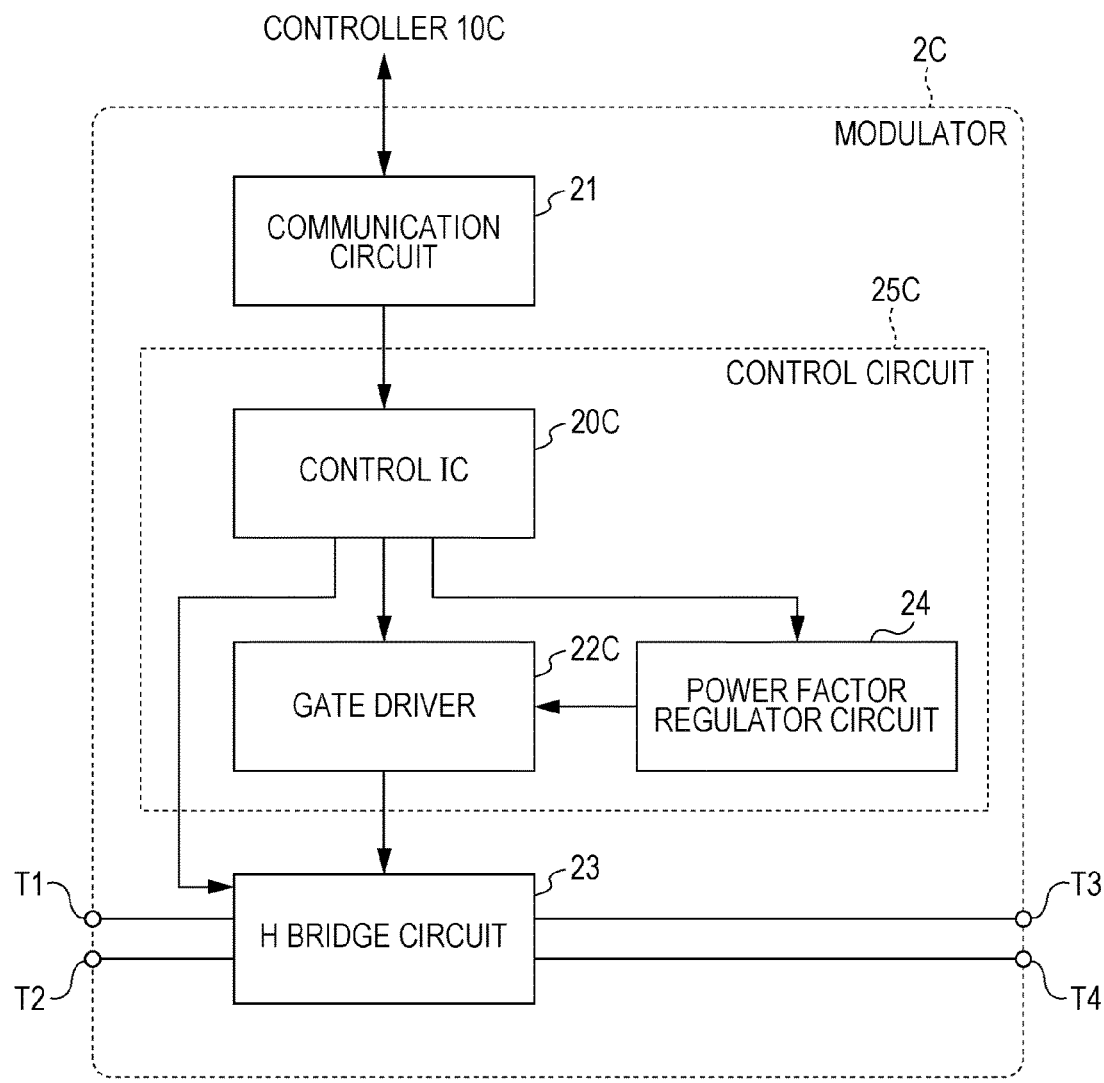
FIG. 22 is a block diagram showing an example configuration of a modulator according to the fourth embodiment.

FIG. 22 shows an example configuration of the modulator 2C.

In FIG. 22, the modulator 2C includes a control circuit 25C, and the control circuit 25C includes a control IC 20C, a gate driver 22C, and a power factor regulator circuit 24. The control circuit 25C has set therefor a reference signal m0 having a predetermined frequency and a predetermined phase. The power factor regulator circuit 24 can change the power factor of the modulated electric power by changing the phase of the reference signal m0. The control circuit 25C receives from the controller 10C via the communication circuit 21 a control signal for improving the power factor of the modulated electric power. For example, under control of the control IC 20C, the power factor regulator circuit 24 changes the phase of the reference signal m0 to be used in the gate driver 22C, so as to improve the power factor of the modulated electric power. This causes the phases of the modulating signals m1 and m2 to be regulated. The H bridge circuit 23 modulates the electric power in accordance with the modulating signals m1 and m2 whose phases have been regulated.

Figure 23:
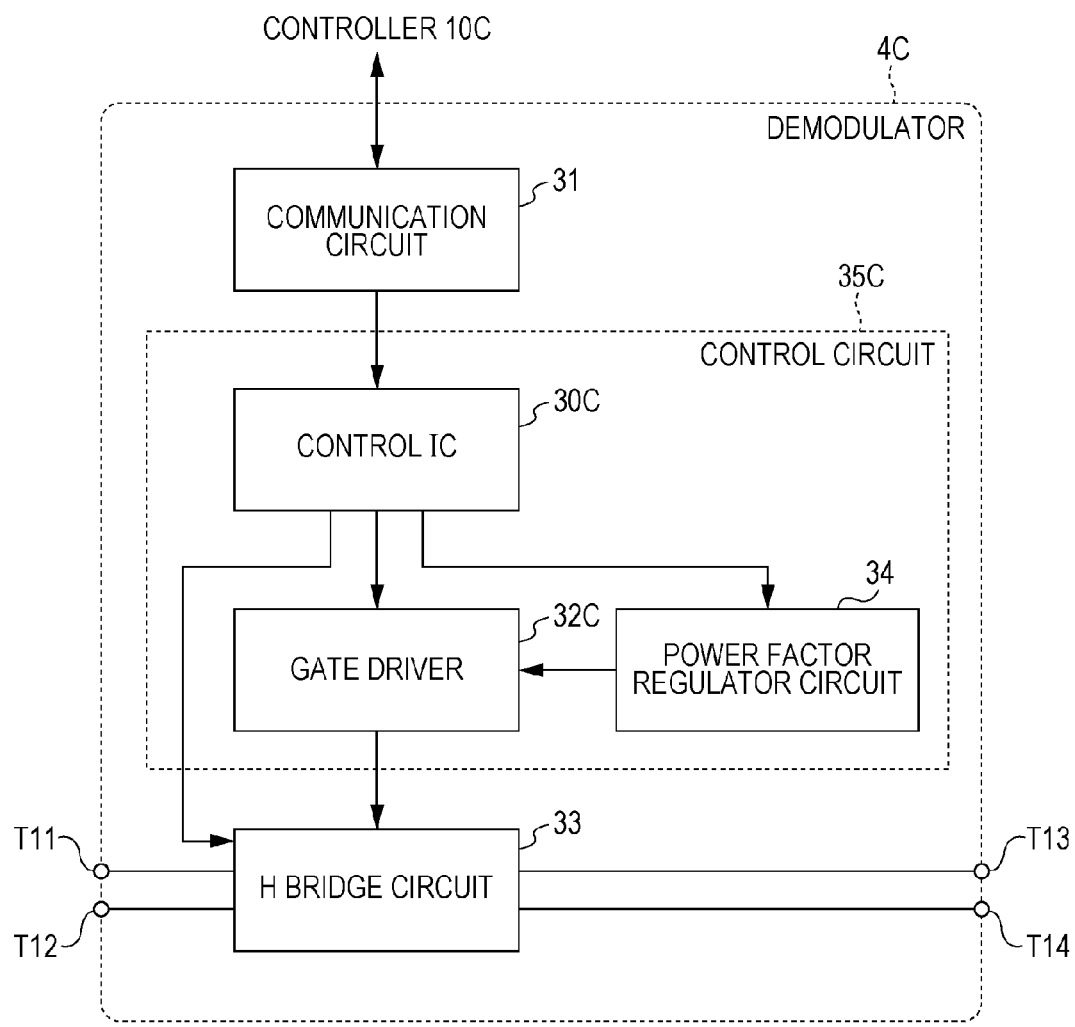
FIG. 23 is a block diagram showing an example configuration of a demodulator according to the fourth embodiment.

FIG. 23 shows a configuration of the demodulator 4C.

In FIG. 23, the demodulator 4C includes a control circuit 35C, and the control circuit 35C includes a control IC 30C, a gate driver 32C, and a power factor regulator circuit 34. The control circuit 35C has set therefor a reference signal m0 having a predetermined frequency and a predetermined phase. The power factor regulator circuit 34 can change the power factor of to-be-demodulated electric power by changing the phase of the reference signal m0. The control circuit 35C receives from the controller 10C via the communication circuit 31 a control signal for improving the power factor of demodulated electric power. For example, under control of the control IC 30C, the power factor regulator circuit 34 changes the phase of the reference signal m0 to be used in the gate driver 32C, so as to improve the power factor of the to-be-demodulated electric power. This causes the phases of the demodulating signals d1 and d2 to be regulated. The H bridge circuit 33 demodulates the electric power in accordance with the modulating signals d1 and d2 whose phases have been regulated.

The efficiency in the transmission of electric power through the transmission line 3 can be improved by improving the power factor of the modulated electric power and/or by improving the power factor of the to-be-demodulated electric power.

Only either the modulator 2C or the demodulator 4C may include a power factor regulator circuit. The electric power transmission system 100C may omit to include either the power factor measuring instrument 11 or 12.

The power factor measuring instrument 11 may be included in the modulator 2C, and the power factor measuring instrument 12 may be included in the demodulator 4C. The power factor measuring instruments 11 and 12 may measure the phase of either current or voltage of the modulated electric power, and the other phase may be measured by the modulator 2C and the demodulator 4C.

Fifth Embodiment

[1. Electric Power Transmission System]

Figure 24:
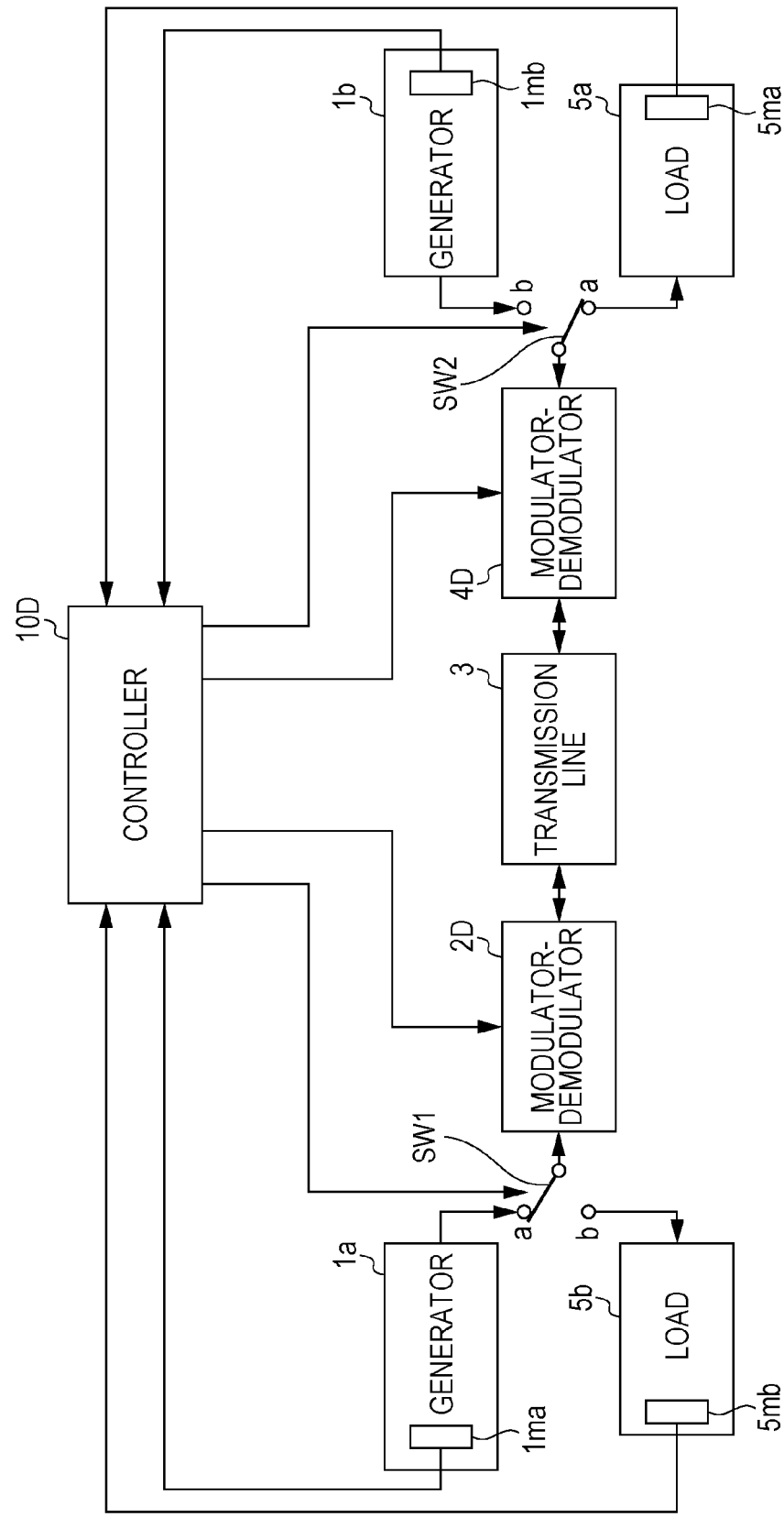
FIG. 24 is a block diagram showing an example configuration of an electric power transmission system according to a fifth embodiment.

FIG. 24 shows an example configuration of an electric power transmission system 100D according to a fifth embodiment. The electric power transmission system 100D of FIG. 24 includes generators 1a and 1b, a modulator-demodulator 2D, a transmission line 3, a modulator-demodulator 4D, loads 5a and 5b, switches SW1 and SW2, and a controller 10D. The generators 1a and 1b and the loads 5a and 5b include electric power measuring instruments 1ma, 1mb, 5ma, and 5mb, respectively.

The modulator 2B shown in FIG. 16 and the demodulator 4B shown in FIG. 17 can be used for both modulation and demodulation, as they include bidirectional switch circuits. Therefore, by the modulator-demodulators 2D and 4D having such circuit structures, the electric power transmission system 100D is made able to bidirectionally transmit electric power.

In FIG. 24, the generator 1a, the load 5b, the switch SW1, and the modulator-demodulator 2D are provided on one side of the transmission line 3, and the generator 1b, the load 5a, the switch SW2, and the modulator-demodulator 4D are provided on the other side of the transmission line 3. Note here that the switches SW1 and SW2 are controlled by the controller 10D.

In a predetermined period T1, the controller 10D switches both the switches SW1 and SW2 to contact points a. At this time, the generator 1a sends source power to the modulator-demodulator 2D. The modulator-demodulator 2D modulates the source power and transmits the modulated electric power to the modulator-demodulator 4D through the transmission line 3. The modulator-demodulator 4D demodulates the transmitted electric power and supplies the demodulated electric power to the load 5a.

In a predetermined period T2, the controller 10D switches both the switches SW1 and SW2 to contact points b. At this time, the generator 1b sends source power to the modulator-demodulator 4D. The modulator-demodulator 4D modulates the source power and transmits the modulated electric power to the modulator-demodulator 2D via the transmission line 3. The modulator-demodulator 2D demodulates the transmitted electric power and supplies the demodulated electric power to the load 5b.

By bidirectionally transmitting electric power, the electric power transmission system 100D makes it possible to consume extra energy when it is needed, thus making it possible to improve overall energy efficiency as an electric power transmission system.

In the electric power transmission system 100D, the transmission of electric power from the generator 1a to the load 5a and the transmission of electric power from the generator 1b to the load 5b can be optionally selected in a time-division manner.

[2. Modification]

Figure 25:
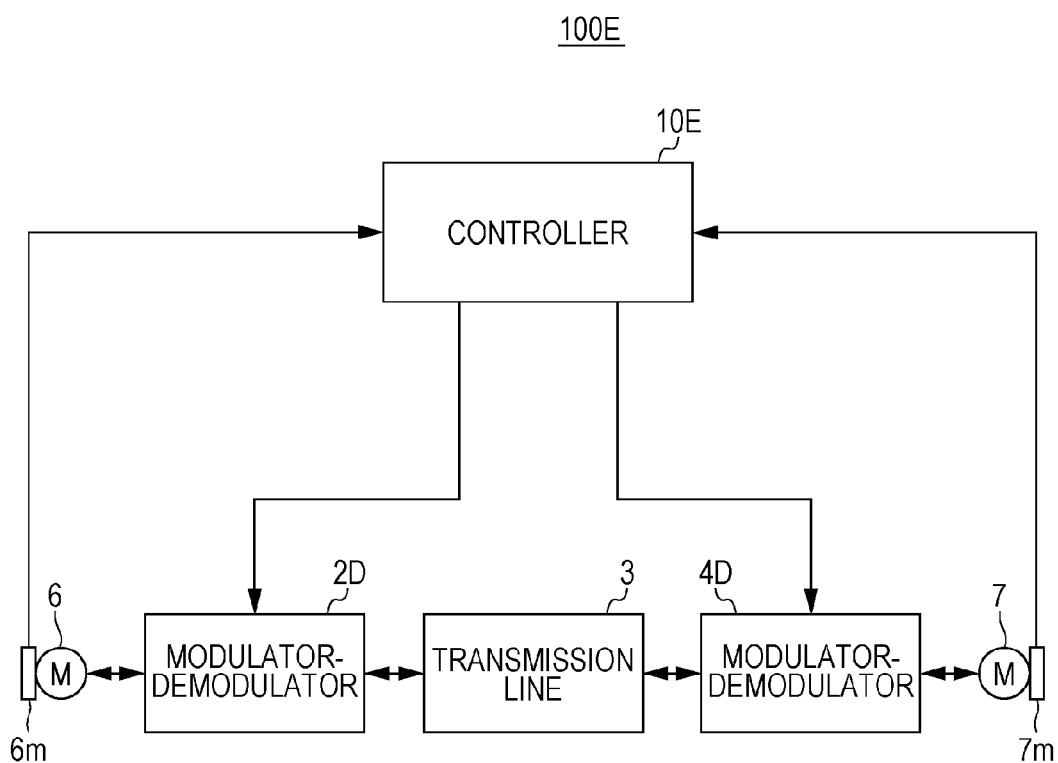
FIG. 25 is a block diagram showing an example configuration of an electric power transmission system according to a modification of the fifth embodiment.

FIG. 25 shows an example configuration of an electric power transmission system 100E according to a modification of the fifth embodiment.

The electric power transmission system 100E is different from the electric power transmission system 100D of FIG. 24 in terms of the following points.

(1) An electric power measuring instrument 6m and a rotator 6 are provided instead of the generator 1a, the load 5b, and the switch SW1. The rotator 6 has two operation modes, namely a generator mode and a load mode (e.g. a motor mode).

(2) An electric power measuring instrument 7m and a rotator 7 are provided instead of the generator 1b, the load 5a, and the switch SW2. The rotator 7 has two operation modes, namely a generator mode and a load mode (e.g. a motor mode).

(3) A controller 10E receives information on amounts of electric power from the electric power measuring instruments 6m and 7m, respectively, and, in response to this, controls the modulator-demodulators 2D and 4D.

In FIG. 25, when the rotator 6 operates in the generator mode, the rotator 7 operates in the load mode. At this time, the modulator-demodulator 2D operates as a modulator, and the modulator-demodulator 4D operates as a demodulator. On the other hand, when the rotator 7 operates in the generator mode, the rotator 6 operates in the load mode. At this time, the modulator-demodulator 4D operates as a modulator, and the modulator-demodulator 2D operates as a demodulator.

It should be noted that the rotator 6 or 7 may for example be replaced by a load circuit.

Other Embodiments

The present disclosure is not limited to the specific examples described in the embodiments above. Technologies of the present disclosure are not limited to the particular examples described in the various embodiments, but also encompass embodiments obtained by making changes, substitutions, additions, and omissions as appropriate with respect to those embodiments. The present disclosure also encompasses an embodiment obtained by combining a plurality of embodiments.

The modulators, demodulators, and controllers exemplified in the embodiments above may be used in any electric power transmission system and are not limited to any particular system.

In the embodiments above, the controllers have been described as being present outside of the modulators and the demodulators. However, the present disclosure is not limited to this. At least part of the function of a controller may be incorporated into at least one of a modulator and a demodulator. At least one of a modulator and a demodulator may be incorporated into a controller. For example, the power factor regulator circuits may be present outside of the modulators and the demodulators.

Although the third embodiment has shown an example in which a bidirectional switch circuit includes two switches, the bidirectional switch circuit may for example be constituted by a single bidirectional switch.

Overview of Embodiments

An electric power transmission system according to a first aspect is directed to an electric power transmission system that includes at least one electric power sending apparatus and at least one electric power receiving apparatus and that transmits electric power from each of the electric power sending apparatuses to a corresponding one of the electric power receiving apparatuses through a wired transmission line, wherein each of the electric power sending apparatuses includes a modulator that modulates electric power at a modulation frequency set in advance for that electric power sending apparatus, each of the electric power sending apparatuses outputs the modulated electric power to the wired transmission line, and each of the electric power receiving apparatuses includes a demodulator that demodulates, at a demodulation frequency set for that electric power receiving apparatus, electric power acquired from the wired transmission line.

An electric power transmission system according to a second aspect is directed to the electric power transmission system according to the first aspect, wherein the electric power transmission system includes one or more pairs of the electric power sending apparatus and the electric power receiving apparatus, one frequency is set as the modulation frequency and the demodulation frequency for the electric power sending apparatus and the electric power receiving apparatus, respectively, for each pair of the electric power sending apparatus and the electric power receiving apparatus, and different frequencies are set as the modulation frequency and the demodulation frequency for different pairs of the electric power sending apparatus and the electric power receiving apparatus, respectively.

An electric power transmission system according to a third aspect is directed to the electric power transmission system according to the first or second aspect, further including a controller that controls transmission of electric power from each of the electric power sending apparatuses to the corresponding one of the electric power receiving apparatuses.

An electric power transmission system according to a fourth aspect is directed to the electric power transmission system according to the third aspect, wherein the modulator generates a first reference signal having the modulation frequency and modulates electric power in accordance with the first reference signal, and the demodulator generates a second reference signal having the demodulation frequency and demodulates electric power in accordance with the second reference signal.

An electric power transmission system according to a fifth aspect is directed to the electric power transmission system according to the fourth aspect, further including a power factor regulator that changes a phase of the first reference signal or a phase of the second reference signal so as to improve a power factor of the modulated electric power.

An electric power transmission system according to a sixth aspect is directed to the electric power transmission system according to the fifth aspect, further including a first measurer that measures an electric current and a voltage between the electric power sending apparatus and the wired transmission line or between the wired transmission line and the electric power receiving apparatus.

An electric power transmission system according to a seventh aspect is directed to the electric power transmission system according to any one of the third to sixth aspects, wherein the controller sends, to the modulator, a control signal that notifies the modulator of the modulation frequency and start and termination times of modulation, the controller sends, to the demodulator, a control signal that notifies the demodulator of the demodulation frequency and start and termination times of demodulation, the modulator modulates electric power in accordance with the control signal, and the demodulator demodulates electric power in accordance with the control signal.

An electric power transmission system according to an eighth aspect is directed to the electric power transmission system according to any one of the third to seventh aspects, wherein the electric power sending apparatus includes a second measurer that measures an amount of electric power that is able to be inputted from a power source connected to the modulator to the modulator, and the electric power receiving apparatus includes a third measurer that measures an amount of electric power that is consumed by a load connected to the demodulator.

An electric power transmission system according to a ninth aspect is directed to the electric power transmission system according to the eighth aspect, wherein the electric power transmission system includes a plurality of the electric power sending apparatuses and a plurality of the electric power receiving apparatuses, and the controller supplies electric power between electric power systems of the plurality of the electric power sending apparatuses and the plurality of the electric power receiving apparatuses by controlling operations of each of the electric power sending apparatuses and each of the electric power receiving apparatuses on the basis of the amount of electric power measured by the second measurer and the amount of electric power measured by the third measurer.

An electric power transmission system according to a tenth aspect is directed to the electric power transmission system according to any one of the third to ninth aspects, wherein instead of transmitting electric power from the electric power sending apparatus to the electric power receiving apparatus in a forward direction, electric power is transmitted from the electric power receiving apparatus to the electric power sending apparatus in a backward direction by causing the modulator of the electric power sending apparatus to operate as a demodulator and causing the demodulator of the electric power receiving apparatus to operate as a modulator.

An electric power sending apparatus according to an eleventh aspect is directed to an electric power sending apparatus that sends electric power to an electric power receiving apparatus through a wired transmission line, the electric power sending apparatus including: a modulator that generates a reference signal having a modulation frequency set in advance for the electric power sending apparatus and modulates electric power in accordance with the reference signal; and a power factor regulator that changes a phase of the reference signal so as to improve a power factor of the modulated electric power.

An electric power receiving apparatus according to a twelfth aspect is directed to an electric power receiving apparatus that receives electric power from an electric power sending apparatus through a wired transmission line, the electric power receiving apparatus further including: a demodulator that generates a reference signal having a demodulation frequency set in advance for the electric power receiving apparatus and demodulates, in accordance with the reference signal, electric power modulated by the electric power sending apparatus at a preset modulation frequency and acquired from the wired transmission line; and a power factor regulator that changes a phase of the reference signal so as to improve a power factor of the electric power modulated and acquired from the wired transmission line.

An electric power receiving apparatus according to a thirteenth aspect is directed to an electric power receiving apparatus that receives electric power from an electric power sending apparatus through a wired transmission line, the electric power receiving apparatus including a demodulator that demodulates, at a demodulation frequency set in advance for the electric power receiving apparatus, electric power modulated by the electric power sending apparatus at a preset modulation frequency and acquired from the wired transmission line, wherein the demodulator includes an LC resonant circuit that resonates at the demodulation frequency.

The electric power receiving apparatus according to a fourteenth aspect is directed to the electric power receiving apparatus according to the thirteenth aspect, wherein the demodulation frequency is variable.

An electric power receiving apparatus according to a fifteenth aspect is directed to an electric power receiving apparatus that receives electric power from an electric power sending apparatus through a wired transmission line, the electric power receiving apparatus including a demodulator that demodulates, at a demodulation frequency set in advance for the electric power receiving apparatus, electric power modulated by the electric power sending apparatus at a preset modulation frequency and acquired from the wired transmission line, wherein the demodulator includes a synchronous rectifier circuit including a plurality of switches.

An electric power transmission system according to the present disclosure is useful, for example, in transmitting electric power from a generator based on photovoltaic power generation, wind power generation, or hydraulic power generation to a railroad vehicle or an electric vehicle (EV).

What is claimed is:
1. A system comprising:
a first modulator that modulates, using a first modulation signal of a first modulation frequency, a first Alternating Current (AC) electric power signal of a first frequency to generate a first modulated electric power, the first modulation frequency being different from the first frequency;
a second modulator that modulates, using a second modulation signal of a second modulation frequency, a second AC electric power signal of a second frequency to generate a second modulated electric power, the second modulation frequency being different from the first modulation frequency and the second frequency;
a transmission line through which a transmission power is transmitted, the transmission power being obtained by combining a plurality of modulated electric powers including the first modulated electric power and the second modulated electric power;
a first demodulator that demodulates, using a first demodulation signal of a first demodulation frequency, the transmission power to generate a third AC electric power signal, the first demodulation signal corresponding to the first modulation signal, the first demodulator including a plurality of first switches; and
a second demodulator that demodulates, using a second demodulation signal of a second demodulation frequency, the transmission power to generate a fourth AC electric power signal, the second demodulation signal corresponding to the second modulation signal, the second demodulator including a plurality of second switches.

2. The system according to claim 1, wherein
the first demodulator includes a first bridge circuit in which the plurality of first switches are connected in a first full-bridge configuration, and
the second demodulator includes a second bridge circuit in which the plurality of second switches are connected in a second full-bridge configuration.

3. The system according to claim 2, wherein
the first modulator includes a third bridge circuit in which a plurality of third switches are connected in a third full-bridge configuration, and
the second modulator includes a fourth bridge circuit in which a plurality of fourth switches are connected in a fourth full-bridge configuration.

4. The system according to claim 1, further comprising:
a controller that:
causes the first modulator to set the first modulation signal,
causes the second modulator to set the second modulation signal,
causes the first demodulator to set the first demodulation signal as being the same as the first modulation signal, and
causes the second demodulator to set the second demodulation signal as being the same as the second modulation signal.

5. The system according to claim 4, further comprising a power factor regulator circuit that changes a phase of at least either the first modulation signal or the second modulation signal.

6. The system according to claim 5, further comprising an electric power measuring instrument disposed between the first modulator and the transmission line or between the first demodulator and the transmission line to measure at least either an electric current or a voltage of the transmission power, wherein the power factor regulator circuit changes the phase of at least either the first modulation signal or the second modulation signal on the basis of information on the transmission power as acquired from the electric power measuring instrument.

7. The system according to claim 4, wherein the controller further sends, to the first modulator and the first demodulator, a synchronizing signal for synchronizing a modulation operation of the first modulator and a demodulation operation of the first demodulator with each other.

8. The system according to claim 4, further comprising:
a first electric power measuring instrument that measures an amount of electricity that is generated by a power source connected to the first modulator; and
a second electric power measuring instrument that measures an amount of electric power that is consumed by a load connected to the first demodulator.

9. The system according to claim 8, wherein the controller controls the first modulator and the first demodulator on the basis of information on the amount of electricity that is generated and the amount of electric power that is consumed.

10. The system according to claim 1, wherein
a third frequency of the third AC electric power signal is the same as the first frequency, and
a fourth frequency of the fourth AC electric power signal is the same as the second frequency.

11. The system according to claim 1, wherein
the first modulation frequency is higher than the first frequency, and
the second modulation frequency is higher than the second frequency.

12. The system according to claim 1, wherein
the first modulator modulates the first AC electric power signal by inverting a first direction of a first current of the first AC electric power signal at the first modulation frequency,
the second modulator modulates the second AC electric power signal by inverting a second direction of a second current of the second AC electric power signal at the second modulation frequency,
the first demodulator demodulates the transmission power by inverting a third direction of a third current of the transmission power at the first demodulation frequency, and
the second demodulator demodulates the transmission power by inverting a fourth direction of a fourth current of the transmission power at the second demodulation frequency.

13. The system according to claim 1, wherein
the first modulation frequency is integral multiples of the second modulation frequency, and
the transmission line is connected with the plurality of first switches and the plurality of second switches without interposing any LC circuit.

14. The system according to claim 1, wherein each of the first modulation signal, the second modulation signal, the first demodulation signal, and the second demodulation signal has a rectangular waveform.

15. A controller comprising:
a processor; and
a communication circuit,
wherein the processor:
generates a first control signal for modulating, using a first modulation signal of a first modulation frequency, a first Alternating Current (AC) electric power signal of a first frequency to generate a first modulated electric power, the first modulation frequency being different from the first frequency;
sends the first control signal to a first modulator via the communication circuit;
generates a second control signal for modulating, using a second modulation signal of a second modulation frequency, a second AC electric power signal of a second frequency to generate a second modulated electric power, the second modulation frequency being different from the first modulation frequency and the second frequency; and
sends the second control signal to a second modulator via the communication circuit, and
a plurality of modulated electric powers including the first modulated electric power and the second modulated electric power are combined and transmitted through a transmission line.

16. The controller according to claim 15, wherein the processor further:
generates a third control signal for demodulating, using a first demodulation signal of a first demodulation frequency, the first modulated electric power, the first demodulation signal corresponding to the first modulation signal;
sends the third control signal to a first demodulator via the communication circuit;
generates a fourth control signal for demodulating, using a second demodulation signal of a second demodulation frequency, the second modulated electric power, the second demodulation signal corresponding to the second modulation signal; and
sends the fourth control signal to a second demodulator via the communication circuit.

17. The controller according to claim 16, wherein the first modulation signal is the same as the first demodulation signal, and the second modulation signal is the same as the second demodulation signal.

18. The controller according to claim 17, wherein the processor further changes a phase of at least either the first modulation signal or the second modulation signal.

19. The controller according to claim 18, wherein the processor further acquires information on at least either an electric current or a voltage of the first modulated electric power and changes the phase of at least either the first modulation signal or the second modulation signal on the basis of the information.

20. The controller according to claim 16, wherein the first control signal and the third control signal contain a synchronizing signal for synchronizing a modulation operation of the first modulator and a demodulation operation of the first demodulator with each other.

21. The controller according to claim 16, wherein the processor further:
acquires information on an amount of electricity that is generated by a power source connected to the first modulator;
acquires information on an amount of electric power that is consumed by a load connected to the first demodulator; and
generates the first control signal and the third control signal on the basis of the information on the amount of electricity that is generated and the information on the amount of electric power that is consumed.

* * * * *